US012600036B2

(12) United States Patent
Ogawa et al.

(10) Patent No.: US 12,600,036 B2
(45) Date of Patent: Apr. 14, 2026

(54) CONTROL DEVICE, CONTROL METHOD, AND STORAGE MEDIUM

(71) Applicant: NEC Corporation, Tokyo (JP)

(72) Inventors: Masatsugu Ogawa, Tokyo (JP); Masumi Ichien, Tokyo (JP); Hisaya Wakayama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 195 days.

(21) Appl. No.: 18/274,139

(22) PCT Filed: Jan. 27, 2021

(86) PCT No.: PCT/JP2021/002820
§ 371 (c)(1),
(2) Date: Jul. 25, 2023

(87) PCT Pub. No.: WO2022/162783
PCT Pub. Date: Aug. 4, 2022

(65) Prior Publication Data
US 2024/0416516 A1      Dec. 19, 2024

(51) Int. Cl.
B25J 9/16          (2006.01)
B25J 19/02         (2006.01)
(52) U.S. Cl.
CPC ........... B25J 9/1661 (2013.01); B25J 9/1664 (2013.01); B25J 19/023 (2013.01)
(58) Field of Classification Search
CPC ...... B25J 9/1661; B25J 9/1664; B25J 19/023; B25J 9/16
USPC ......................................................... 700/245
See application file for complete search history.

(56) References Cited

U.S. PATENT DOCUMENTS

| | | | | |
|---|---|---|---|---|
| 10,017,285 B2 * | 7/2018 | Boudreau | ............... | B65B 35/36 |
| 2014/0353117 A1 | 12/2014 | Gotou | | |
| 2016/0039550 A1 | 2/2016 | Boudreau et al. | | |
| 2017/0225330 A1 * | 8/2017 | Wagner | .................. | B25J 9/1664 |
| 2018/0085922 A1 | 3/2018 | Ooba | | |
| 2018/0273296 A1 | 9/2018 | Wagner et al. | | |
| 2018/0273298 A1 * | 9/2018 | Wagner | ............... | B65G 1/1378 |
| 2019/0034727 A1 * | 1/2019 | Chihara | ................... | G06T 7/74 |

(Continued)

FOREIGN PATENT DOCUMENTS

| | | |
|---|---|---|
| JP | 2003-211096 A | 7/2003 |
| JP | 2010-202291 A | 9/2010 |

(Continued)

OTHER PUBLICATIONS

International Search Report for PCT Application No. PCT/JP2021/002820, mailed on Apr. 20, 2021.

(Continued)

*Primary Examiner* — Kira Nguyen
(74) *Attorney, Agent, or Firm* — Sughrue Mion, PLLC

(57) ABSTRACT

A control device 1X mainly includes an operation planning means 15X and a determination means 16X. The operation planning means 15X determines an operation plan of a robot regarding a work of sorting plural items into plural sorting containers. The determination means 16X determines whether or not the sorting containers are replenished. Then, the operation planning means 15X updates the operation plan based on the arrangement of the sorting containers after the replenishment if the sorting containers is replenished.

11 Claims, 11 Drawing Sheets

(56) References Cited

U.S. PATENT DOCUMENTS

| | | |
|---|---|---|
| 2019/0167068 A1 | 6/2019 | Yoon et al. |
| 2020/0023514 A1* | 1/2020 | Tellex et al. |
| 2020/0078935 A1* | 3/2020 | Kimura ..................... B25J 9/10 |
| 2020/0276699 A1 | 9/2020 | Buerger et al. |
| 2022/0048707 A1* | 2/2022 | Matl .................... B65G 1/1373 |
| 2023/0321825 A1* | 10/2023 | Kulkarni ............... B25J 9/1697 |
| | | 700/260 |

FOREIGN PATENT DOCUMENTS

| | | |
|---|---|---|
| JP | 2014-231420 A | 12/2014 |
| JP | 2018-051684 A | 4/2018 |
| JP | 2019-025566 A | 2/2019 |
| JP | 2020-203361 A | 12/2020 |
| KR | 20-0455226 Y1 | 8/2011 |
| WO | 2018/034252 A1 | 2/2018 |
| WO | 2019/121338 A1 | 6/2019 |

OTHER PUBLICATIONS

JP Office Action for JP Application No. 2022-577875, mailed on Dec. 10, 2024 with English Translation.
JP Office Action for JP Application No. 2022-577875, mailed on Aug. 27, 2024 with English Translation.

* cited by examiner

100 : SORTING CONTROL SYSTEM

START

S21

DETERMINE OPERATION PLAN OF ROBOT
REGARDING WORK OF SORTING ITEMS INTO
SORTING CONTAINERS

S22

SORTING CONTAINERS
REPLENISHED ?    No

Yes

S23

UPDATE OPERATION PLAN BASED ON
ARRANGEMENT OF SORTING CONTAINERS
AFTER REPLENISHMENT

END

CONTROL DEVICE, CONTROL METHOD, AND STORAGE MEDIUM

This application is a National Stage Entry of PCT/JP2021/002820 filed on Jan. 27, 2021, the contents of all of which are incorporated herein by reference, in their entirety.

TECHNICAL FIELD

The present invention relates to a technical field regarding a control device, a control method, and a storage medium for processing relating to a task to be worked by a robot.

BACKGROUND

There is proposed such a control method to perform control of a robot necessary for executing the task when a task to be performed by a robot is given. For example, Patent Literature 1 discloses a robot controller configured, when placing a plurality of objects in a container by a robot with a hand for gripping an object, to determine possible orders of gripping the objects by the hand and to determine the order of the objects to be placed in the container board on the index calculated with respect to each of the possible orders. Further, Patent Literature 2 discloses a system configured to cause a robot to pack separated parts in a sort pallet in accordance with the packing plan of the separated parts.

CITATION LIST

Patent Literature

Patent Literature 1: JP 2018-051684A
Patent Literature 2: JP 2010-202291A

SUMMARY

Problem to be Solved

A work of sorting a plurality of types of items accommodated in a box such as corrugated cardboard by type or lot number is related to plural works such as picking up items from a box, moving items into a sorting container (tray) according to the type of the items, conveying the tray. Thus, for such a work, it is difficult to formulate a robot's operation plan to automate work.

In view of the issues described above, one object of the present invention is to provide a control device, a control method, and a storage medium capable of causing a robot to suitably perform a task relating to sorting items.

Means for Solving the Problem

In one mode of the control device, there is provided a control device including:

an operation planning means configured to determine an operation plan of a robot regarding a work of sorting plural items into plural sorting containers; and a determination means configured to determine whether or not the sorting containers are replenished, wherein the operation planning means is configured, if the sorting containers are replenished, to update the operation plan based on the replenishment.

In one mode of the control method, there is provided a control method executed by a computer, the control method including determining an operation plan of a robot regarding a work of sorting plural items into plural sorting containers; and determining whether or not the sorting containers are replenished, if the sorting containers are replenished, updating the operation plan based on the arrangement of the sorting containers after the replenishment.

In one mode of the storage medium, there is provided a storage medium storing a program executed by a computer, the program causing the computer to:

determine an operation plan of a robot regarding a work of sorting plural items into plural sorting containers; and determine whether or not the sorting containers are replenished, if the sorting containers are replenished, update the operation plan based on the arrangement of the sorting containers after the replenishment.

Effect

An example advantage according to the present invention is to suitably cause a robot to perform a task relating to sorting items.

BRIEF DESCRIPTION OF THE DRAWINGS

FIG. 6 It is an example of a functional block of an operation planning unit.

EXAMPLE EMBODIMENTS

Hereinafter, an example embodiment of a control device, a control method, and a storage medium will be described with reference to the drawings.

First Example Embodiment

(1) System Configuration

Figure 1:
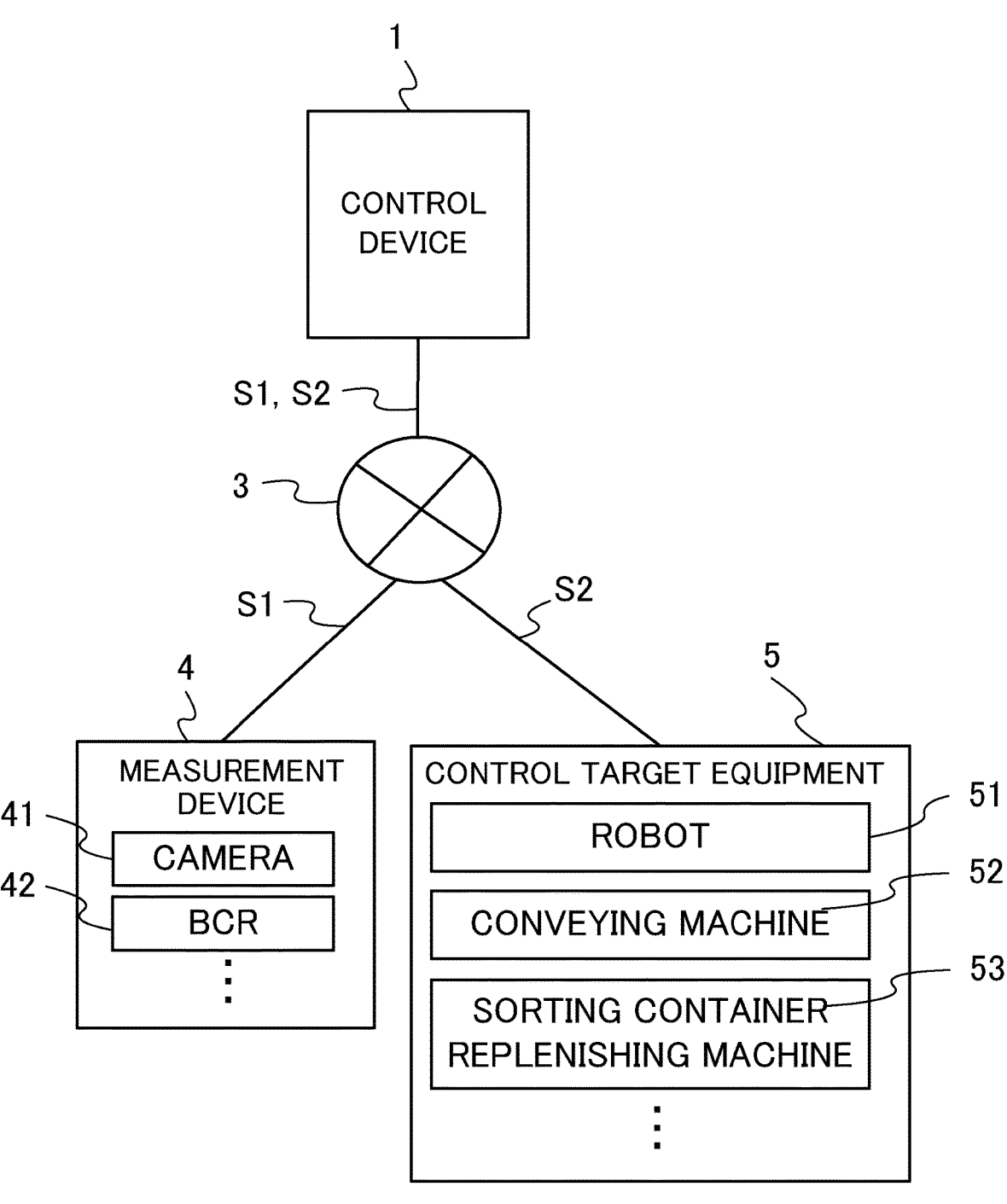
FIG. 1 It is an example of the configuration of a sorting control system in a first example embodiment.

FIG. 1 shows a configuration of a sorting control system 100 according to the first example embodiment. The sorting control system 100 automatically or semi-automatically executes a work (also referred to as "parts sorting") of sorting (assorting) items such as chemicals carried in a warehouse by type or lot number, and mainly includes a control device 1, a measurement device 4, and a control target equipment 5. The control device 1 and the measurement device 4 and the control target equipment 5 performs data communication via the communication network 3 with one another.

The control device 1 supplies, based on a measurement signal "S1" supplied from the measurement device 4, a control signal "S2" required to execute the parts sorting, to the control target equipment 5 such as a robot 51. In this case, the control device 1 sets a task (also referred to as "objective task") to be executed by the robot 51, and formulates an operation plan of the robot 51 for executing the set objective task based on temporal logics. In this case, the control device 1 converts the objective task into a time-step sequence (sequence for each time step) of tasks each of which the robot 51 can accept. Then, the control device 1 controls the robot 51 by supplying a control signal S2 representing the generated operation sequence to the robot 51. Thereafter, each task (command) into which the objective task is decomposed by a unit that is acceptable to the robot 51 is referred to as "subtask," and a sequence of subtasks to be executed by the robot 51 in order to accomplish the objective task is referred to as "operation sequence". In the present example embodiment, as an example, the process of formulating the operation plan based on the temporal logic will be described. However, instead of formulating the operation plan based on the temporal logic, the control device 1 may formulate the operation plan according to any other method.

The measurement device 4 is one or more sensors configured to detect a state (condition) in the workspace where the parts sorting is performed. The measurement device 4 includes, for example, a camera 41 and a BCR (Bar-Code Reader) 42. The measurement device 4 supplies the generated measurement signal S1 to the control device 1 via the communication network 3. The measurement device 4 may include a self-propelled sensor or a flying sensor (including a drone) that moves within the workspace. The measurement device 4 may also include a sensor provided in the control target equipment 5 such as the robot 51 and a sensor provided in any other object in the workspace. The measurement device 4 may also include a sensor configured to detect sound in the workspace. As such, the measurement device 4 may include a variety of sensors configured to detect the state in the workspace, and may include a sensor provided at any location.

The control target equipment 5 is provided in the workspace where the parts sorting is performed, and is controlled based on the control signal S2 or the like supplied from the control device 1. In the present example embodiment, as an example, the control target equipment 5 includes the robot 51, a conveying machine (conveyor) 52 for conveying items in a warehouse, and a sorting container replenishing machine 53 for replenishing sorting containers such as a tray in which the robot 51 places the sorted items. There are a plurality of robots 51 in the workspace, and the robots 51 perform tasks relating to parts sorting cooperatively as necessary. The robot 51 may be any type of robot such as a vertical articulated robot and a horizontal articulated robot. The robot 51 may supply a state signal indicating the state of the robot 51 to the control device 1. The state signal may be an output signal from a sensor for detecting the entire state (e.g., position and angle) of the robot 51 or the state of a specific part, such as a joint, of the robot 51 or a specific site, and it may be a signal indicating the progress of a subtask of the robot 51 generated by the control unit of the robot 51.

The configuration of the sorting control system 100 shown in FIG. 1 is an example, and various changes may be made to the configuration. For example, the control device 1 may perform data communication with the measurement device 4 and the control target equipment 5, by wireless or wired direct communication without passing through the communication network 3. Further, the control device 1 and the robot 51 may be integrally configured. The control device 1 may be configured by a plurality of devices. In this case, the plurality of devices constituting the control device 1 exchange information necessary to execute the process allocated in advance, among the plurality of devices. Further, the robot 51 may incorporate at least some or all of the functions of the control device 1.

(2) Hardware Configuration

Figure 2:
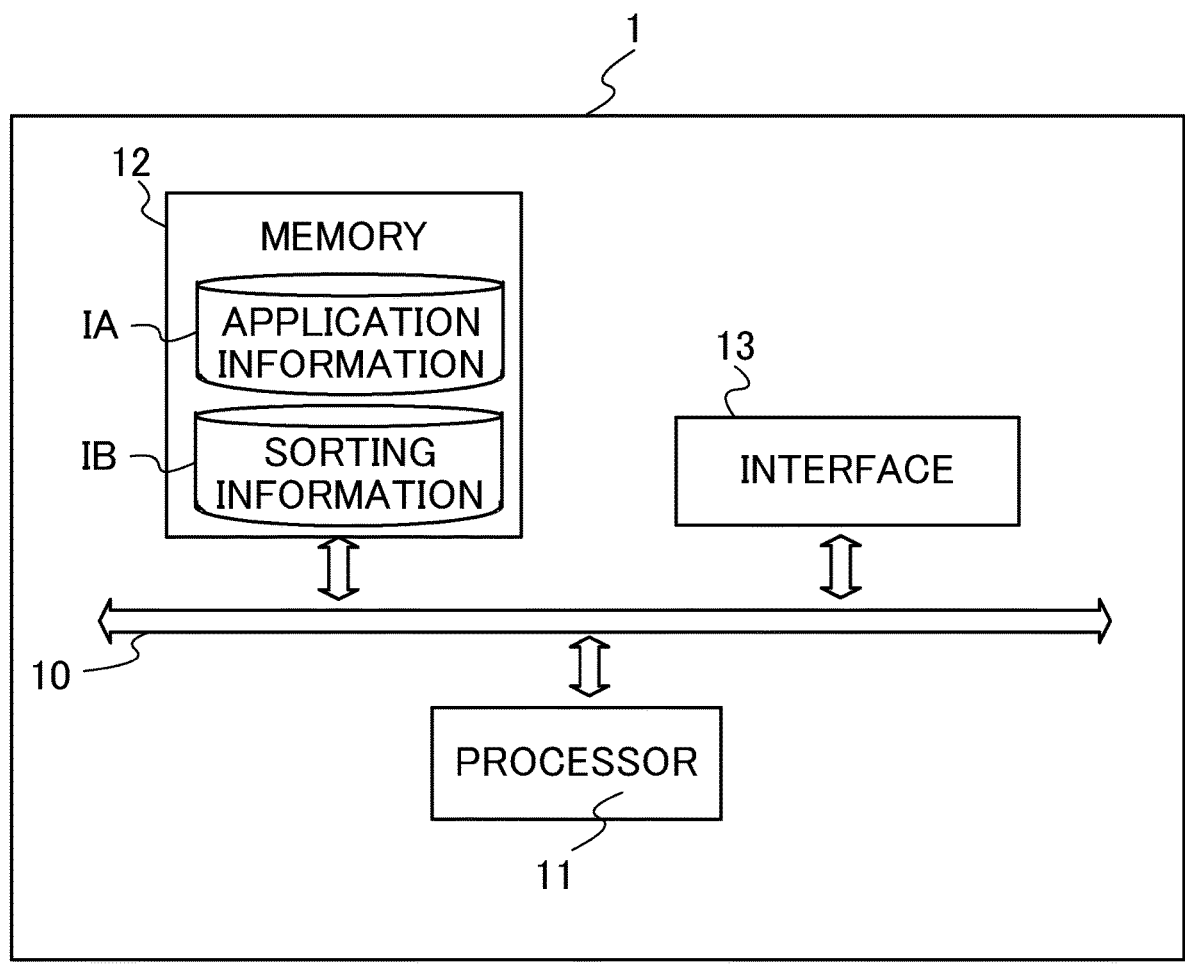
FIG. 2 It is an example of the hardware configuration of a control device.

FIG. 2 shows a hardware configuration of the control device 1. The control device 1 includes a processor 11, a memory 12, and an interface 13 as hardware. The processor 11, the memory 12 and the interface 13 are connected to one another via a data bus 10.

The processor 11 functions as a controller (arithmetic unit) for controlling the entire control device 1 by executing a program stored in the memory 12. Examples of the processor 11 include a CPU (Central Processing Unit), a GPU (Graphics Processing Unit), and a TPU (Tensor Processing Unit). The processor 11 may be configured by a plurality of processors. The processor 11 is an example of a computer.

The memory 12 is configured by a variety of volatile and non-volatile memories, such as a RAM (Random Access Memory), a ROM (Read Only Memory), and a flash memory. Further, the memory 12 stores a program for the control device 1 to execute a process. The memory 12 also includes application information IA and sorting information IB.

The application information IA is various information required for generating an operation sequence that is a sequence to be executed by the robot 51 from the objective task. The sorting information IB is information related to sorting of items, and is, for example, information in which identification information (ID) of each item read from a bar code attached to the each item is associated with the class of the each item to be used in sorting. The above-mentioned class is determined by classification based on whether or not they are supposed to be housed in the same sorting container, e.g., based on the type or the lot number of the each item. If the ID (identification information) is attached to each sorting container, the sorting information IB may be information in which the ID of each item read from the bar code is associated with the ID of the sorting container to be the destination of the each item.

A part of the information stored in the memory 12 may be stored by one or more external storage devices that can communicate with the control device 1, or may be stored by a storage medium such as a flash memory removable from the control device 1.

The interface 13 is one or more interfaces for electrically connecting the control device 1 to other devices. Examples of these interfaces include a wireless interface, such as network adapters, for transmitting and receiving data to and from other devices wirelessly, and a hardware interface, such as a cable, for connecting to other devices.

The hardware configuration of the control device 1 is not limited to the configuration shown in FIG. 2. For example, the control device 1 may be connected to or incorporate at least one of a display device, an input device, and a sound output device.

(3) Overview of Parts Sorting

Figure 3:
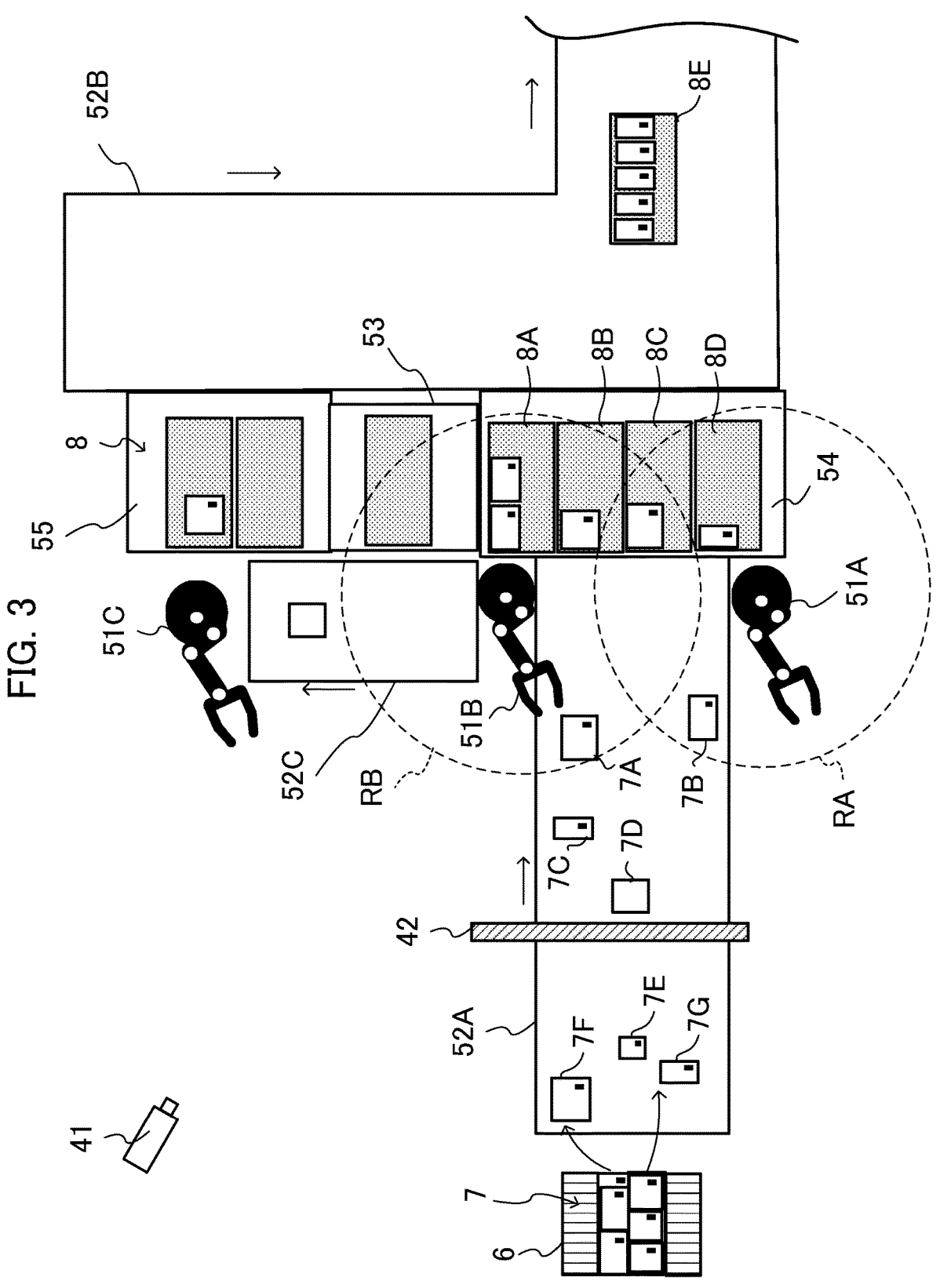
FIG. 3 It is an example of a bird's-eye view of a workspace of sorting separated parts.

FIG. 3 is an overhead view of the workspace schematically illustrating an example of parts sorting by the sorting control system 100. FIG. 3 schematically illustrates the work of sorting the items 7 (7A to 7G, . . . ) taken out from a packing box 6 in the warehouse into a plurality of sorting containers 8 (8A to 8D, . . . ), wherein the packing box 6 which houses a plurality of types of items to be sorted is delivered from manufacturer or the like to the warehouse. The camera 41 is installed so that the workspace is included within the photographing range. The camera 41 may be a plurality of cameras having different photographing ranges, and may capture images respectively to cover necessary points for the state recognition of the workspace.

In the workspace shown in FIG. 3, there are a first conveying machine 52A, a second conveying machine 52B, and a third conveying machine 52C, which are examples of the conveying machine 52. In FIG. 3, supplementary arrows representing the conveying direction are attached to the first conveying machine 52A, the second conveying machine 52B, and the third conveying machine 52C.

The first conveying machine 52A is, for example, a conveyor belt, and conveys the items 7 (7A to 7G, . . . ) taken out from the packing box 6 by a worker or a robot in the direction toward a movement range "RA" of the robot arm 51A or a movement range "RB" of the robot arm 51B. The first conveying machine 52A is equipped with a BCR 42 for reading the bar code of each item prior to reaching the movement ranges of the robot arms 51A and 51B. Each item 7 taken out of the packing box 6 is placed on the first conveying machine 52A so that the surface to which the bar code is attached faces upward. The conveying speed by the first conveying machine 52A may be a constant speed, or may be adjusted under the control of the control device 1 or the like. For example, if the robot arm 51A and the robot arm 51B passes the items 7 to each other, under the control of the control device 1, during the handover operation, the first conveying machine 52A may be adjusted to pause or decelerate. The first conveying machine 52A may be adjusted to pause or decelerate not only during the handover period but also during the overall operation period of the robot arms.

The second conveying machine 52B is a material handling machinery configured to convey the sorting containers 8 containing the sorted items 7 to an area of shelf(s) which house the sorting containers 8.

The third conveying machine 52C conveys items 7, which require exceptional treatment, in the direction toward the movement range of the robot arm 51C. Any items 7 (e.g., the items 7D) without a bar code or any other items 7 to be inspected such as items absence of registrations of the attribute information such as size are conveyed from the first conveying machine 52A to the third conveying machine 52C. It should be noted that the operation of conveying such an item 7 to the third conveying machine 52C may be performed by the robot arm 51B, or may be performed by a machine other than the robot arm 51B, or may be performed by manual operation. Similarly, the process of attaching the bar code or the inspection process e to the item 7 conveyed to the third conveying machine 52C may be performed by the robot arm 51C, or may be performed by a machine other than the robot arm 51C, or may be performed by manual operation.

Further, between the first conveying machine 52A and the second conveying machine 52B, there is provided a sorting container board 54 where the sorting containers 8 are placed. The sorting container board 54 can be loaded up to four sorting containers 8, and on the sorting container board 54, the sorting containers 8 (8A to 8D) which the robot arms 51A and 51B use for sorting items are placed. Similarly, between the third conveying machine 52C and the second conveying machine 52B, there is provided a sorting container board 55.

The same type of items 7 or the items 7 with the same lot number are to be placed in the same sorting container 8 on the sorting container board 54. The sorting container 8 which satisfies a predetermined condition is transferred to the second conveying machine 52B. Specifically, if there is a sorting container 8 in a predetermined reference state (e.g., a state that any further item 7 cannot be accommodated), or if an additional sorting container 8 is needed to be loaded on the sorting container board 54, the sorting container 8 is loaded from the sorting container board 54 to the second conveying machine 52B. The carrying operation may be performed by the sorting container board 54 or may be performed by the robot arm 51A or the robot arm 51B. In the former case, the sorting container board 54, for example, has a mechanism of sliding each of the sorting container 8 individually, and based on the control signal S2 supplied from the control device 1, places the designated sorting container 8 on the second conveying machine 52B by sliding it to the direction toward the second conveying machine 52B. In the latter case, the robot arm 51A or the robot arm 51B moves the target sorting container 8 to the second conveying machine 52B by a pushing operation or a pick-up place operation for the target sorting container 8 on the basis of a control signal S2 supplied from the control device 1.

Also on the sorting container board 55, the sorting containers 8 to be used by the robot arm 51C for sorting are placed. Then, in the sorting containers 8 on the sorting container board 55, items 7 subjected to exceptional treatment such as bar-code attachment or/and inspection process are placed by the robot arm 51C. It is noted that, since the number of the items 7 to be subjected to the exception treatment is small, for example, one sorting container 8 is used per one item 7. Accordingly, the sorting container 8 in which the items 7 is accommodated is transferred by the robot arm 51C or the sorting container board 55 to the second conveying machine 52B.

The sorting container replenishing machine 53 is a mechanism for replenishing the sorting container board 54 and the sorting container board 55 with a sorting container 8. For example, if any of the sorting containers 8 on the sorting container board 54 or on the sorting container board 55 is transferred onto the second conveying machine 52B, the sorting container replenishing machine 53 replenishes the sorting container board 54 or the sorting container board 55 from which the sorting container 8 is unloaded with an additional sorting container 8. In this case, for example, the sorting container replenishing machine 53 has a mechanism for holding sorting containers 8 for replenishment and a mechanism for supplying the sorting container 8 by pushing (sliding) it to the sorting container board 54 or the sorting container board 55 to be supplied with the sorting container 8. In this case, for example, when any of the sorting container 8B to the sorting container 8D in FIG. 3 has been unloaded, the sorting container replenishment mechanism 53 supplies a sorting container 8A for replenishment to the sorting container board 54 to thereby slide the sorting container 8A to the position of the sorting container 8B in FIG. 3 and load a new sorting container 8 for replenishment in a position where the sorting container 8A was present. The sorting container replenishing machine 53 may be configured to be supplied with the sorting container 8 for replenishment from a conveyor configured to convey the sorting container 8 for replenishment.

The robot arm 51A and the robot arm 51B are provided at positions facing each other across the first conveying machine 52A. In FIG. 3, the movement range RA of the robot arm 51A and the movement range RB of the robot arm 51B are indicated by dashed circles. The robot arm 51A and the robot arm 51B are examples of the "first robot" and the "second robot", respectively.

As shown in FIG. 3, the movement range RA of the robot arm 51A and the movement range RB of the robot arm 51B partially overlap with each other on the first conveying machine 52A and are provided at a position covering the range on the first conveying machine 52A that is outside the movement range of the other. This allows at least either the robot arm 51A or the robot arm 51B to grasp any item 7 on the first conveying machine 52A. Specifically, the items 52A, the items 7C, the items 7F, etc., to be conveyed by the first conveying machine 7A are outside the movement range RA even when these are carried near the front of the robot arm 51A (in this case, carried in the direction of a hypothetical vertical line drawn from the position of the robot arm 51A to the first conveying machine 52A). On the other hand, these items fall within the range of movement range RB when they are carried to near the front of the robot arm 51B.

Further, even when the items 52A and the items 7B and the items 7G to be conveyed by the first conveying machine 51B are carried in the vicinity of the front of the robot arm (here, in the direction of a hypothetical vertical line drawn from the position of the robot arm 51B to the first conveying machine 52A), these items are outside the movement area RB. On the other hand, these items fall within the movement range RA when they are carried to near the front of the robot arm 51A.

Further, at least one of the robot arm 51A and the robot arm 51B is capable of placing an item 7 in any of the sorting containers 8A to 8D on the sorting container board 54. In the example shown in FIG. 3, the sorting container 8C and the sorting container 8D are outside the range of the movement range RB of the robot arm 51B and within the range of the movement range RA of the robot arm 51A, whereas the sorting container 8A and the sorting container 8B are outside the range of the movement range 51A of the robot arm 51A and within the range of the movement range RB of the robot arm 51B.

In this way, since the movement range RA and the movement range RB are overlapped with each other, the robot arm 51A and the robot arm 51B can pass or receive an item 7 to or from each other. Specifically, if there is an item 7 to be placed in a sorting container which a robot arm cannot reach and the item 7 is outside the movement range of the other robot arm, the robot arm places the item 7 in the movement range of the other robot arm. In this case, the other robot arm places the item 7 moved by the robot arm in the appropriate sorting container 8 by pick-and-place. The control device 1 incorporates such an operation into the operation plan of the robot arms 51A and 51B, and thereby enables the robot arms 51A and 51B to perform the sorting operation so as to place an item 7 which exists at any position on the first conveying machine 52A in the appropriate sorting container 8.

A specific example of the delivery described above will be described with reference to FIG. 3. For example, an items 7A is to be placed in the sorting container 8C and exists outside the movement range RA and within the movement range RB. In this case, the control device 1 formulates an operation plan of the robot arms 51A and 51B so as to move the items 7A by pick-and-place by the robot arm 51B into the movement range RA, and then move the items 7A after the movement into the sorting container 8C by pick-and-place by the robot arm 51A. Similarly, the item 7B is to be placed in the sorting container 8A and exists outside the movement range RB and within the movement range RA. In this instance, the control device 1 causes the robot arm 51A to move the item 7B by pick-and-place into the movement range RB and then causes the robot arm 51B to move the moved item 7B to the sorting container 8A by pick-and-place.

In determining whether or not such a delivery is necessary, the control device 1 may determine whether or not the item 7 is within the movement range of a robot arm based on the position at the time when the item 7 is carried by the first conveying machine 52A to the position closest to the robot arm (front position in the case shown in FIG. 3). For example, the item 7D is outside the movement ranges RA and RB at the time point shown in FIG. 3, but will be within the movement ranges RA and RB at the time point of being carried to the front position of the robot arms 51A and 51B. Thus, the control device 1 determines that the item 7D is within the movement ranges RA and RB in determining the necessity of the delivery.

The robot arm 51C moves, by pick-and-place, an item 7 on the third conveying machine 52C after the exceptional treatment such as bar code attachment and/or inspection process into a sorting container 8 placed on the sorting container board 55.

(4) Functional Blocks

Figure 4:
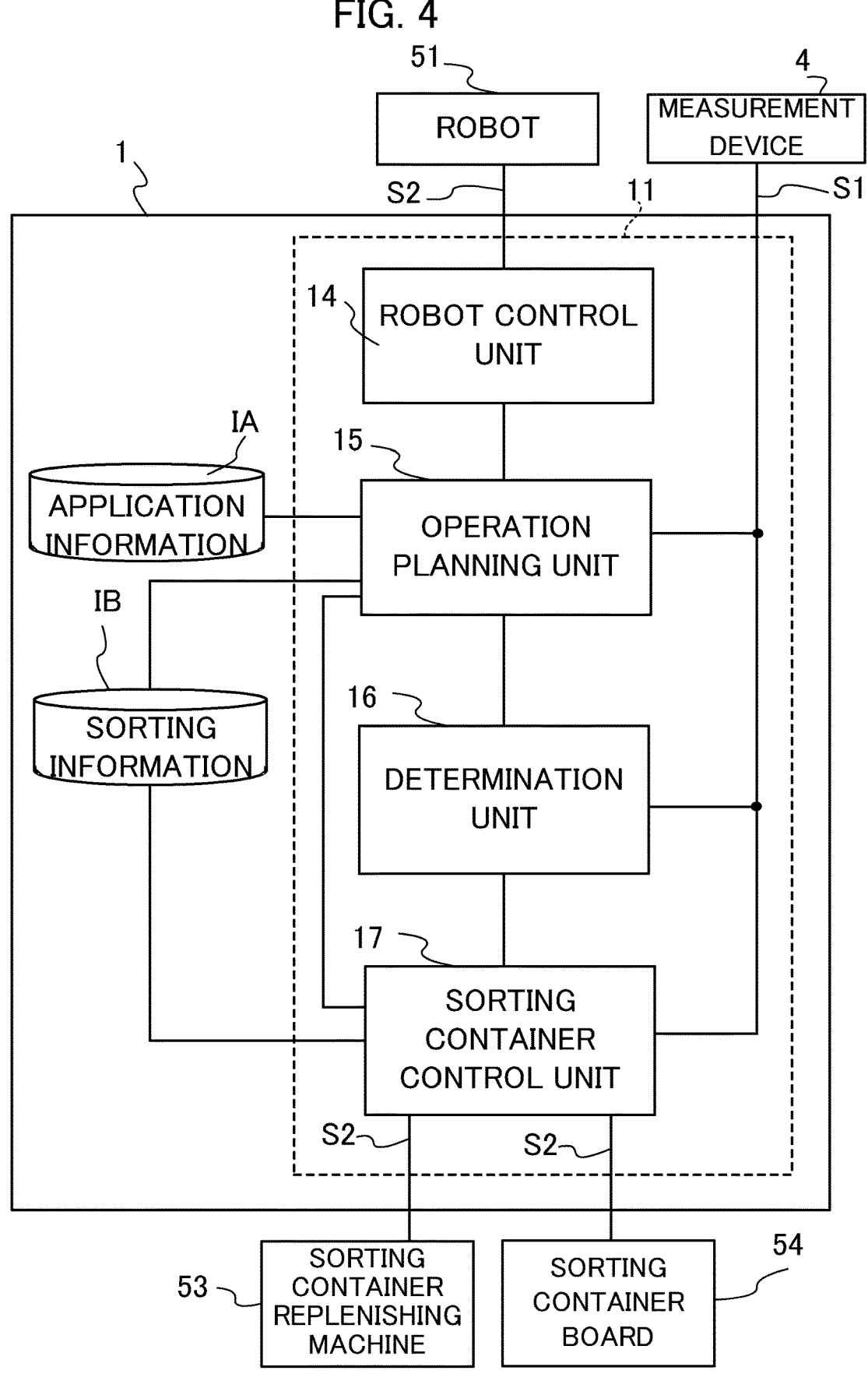
FIG. 4 It is an example of a functional block of the control device.

FIG. 4 is an example of a functional block showing an outline of the processing of the control device 1. Schematically, the control device 1 formulates the operation plan of the robot 51 for sorting items 7 into appropriate sorting containers 8, and updates (re-determines) the operation plan if replenishment of sorting containers 8 is performed. Thus, even when the arrangement changes or the like of the sorting containers 8 have occurred, the control device 1 operates the robot 51 so as to sort the items 7 into appropriate sorting containers 8 that are sorting destinations. The processor 11 of the control device 1 functionally includes a robot control unit 14, an operation planning unit 15, a determination unit 16, and a sorting container control unit 17. In FIG. 4, any blocks to exchange data with each other are connected by solid line, but the combination of blocks to exchange data with each other is not limited to FIG. 4. The same applies to the drawings of other functional blocks described below.

The robot control unit 14 controls the robot 51 to operate the robot 51 according to the operation plan determined by the operation planning unit 15 by transmitting a control signal S2 to the robot 51. Specifically, the robot control unit 14 performs control (for example, position control or torque control of the joint(s) of the robot 51, etc.,) of the robot 51 to execute each subtask constituting the operation sequence generated by the operation planning unit 15 at the execution timing (time step) defined respectively. Further, if the robot control unit 14 receives the updated operation sequence from the operation planning unit 15 during the control of the robot 51 based on the operation sequence, the robot control unit 14 performs operation control of the robot 51 based on the updated operation sequence.

The robot 51 may be equipped with the function corresponding to the robot control unit 14, in place of the control device 1. In this instance, the robot 51 receives the control signal S2 representing the operation sequence generated by the operation planning unit 15, and performs position control of the joint(s), torque control, or the like for realizing the operation sequence.

Based on the application information IA, the sorting information IB, and the measurement signal S1, the operation planning unit 15 generates an operation sequence of the robot 51 related to pick-and-place for moving items 7 to be sorted into the sorting containers 8 according to the classification of the items 7. Then, the operation planning unit 15 supplies the generated operation sequence to the robot control unit 14. Here, the operation sequence includes information indicating the execution order and execution timing of each subtask.

Further, if the operation planning unit 15 receives from the determination unit 16 the determination result indicating that a new sorting container 8 has been loaded, the operation planning unit 15 updates (re-determines) the operation plan regarding pick-and-place of the items 7 to be sorted which is not yet sorted in the sorting containers 8 to thereby generate the operation sequence of the robot 51.

Here, a supplementary description will be given of the necessity of updating the above-described operation plan. If a sorting container 8 is loaded as replenishment, it could generate such an additional option, in the operation planning regarding the robot 51, that the loaded sorting container 8 which is empty is set as a candidate of the destination of the item 7. Besides, the replenishment of the sorting containers 8 could also lead to change (shift) in the arrangement of the existing sorting containers 8. Taking the above into consideration, if the sorting containers 8 are replenished, the operation planning unit 15 updates (re-determines) the operation plan for pick-and-place of the items 7 to be sorted which is not yet sorted into the sorting containers 8. This allows the operation planning unit 15 to suitably develop an operation plan for the robot 51 to move the items 7 into the appropriate sorting containers 8 that are the destinations of the items 7.

The determination unit 16 determines whether or not the sorting container 8 is replenished, and supplies the determination result to the operation planning unit 15. In this case, the determination unit 16 may determine whether or not the sorting container 8 is replenished, based on the measurement signal S1 supplied from the measurement device 4, or the determination unit 16 may determine whether or not the sorting container 8 is replenished, based on a signal supplied from the sorting container control unit 17. In the former case, for example, if the determination unit 16 detects, based on an image taken by the camera 41, a new sorting container 8 disposed in a predetermined place (in FIG. 3 the sorting container board 54), the determination unit 16 determines that the sorting containers 8 are replenished. Further, in the latter case, if the determination unit 16 receives a signal indicative of the execution completion of the process of loading a new sorting container 8 from the sorting container control unit 17, the determination unit 16 determines that the sorting containers 8 are replenished.

In the example shown in FIG. 3, the determination unit 16 makes only the determination relating to the presence or absence of replenishment of the sorting containers 8 on the sorting container board 54, and does not have to make a determination relating to the presence or absence of replenishment of the sorting containers 8 for housing the items 7 after the exception treatment. In this case, the operation planning unit 15 may not update the operation plan of the robot arm 51A and the robot arm 51B even when the sorting container board 55 is replenished with a sorting container 8. In this instance, for example, the operation planning unit 15 independently executes an operation plan of the robot arm 51A and the robot arm 51B and an operation plan of the robot arm 51C. Determination and updating of the operation plan to be described below shall be directed to the operation plan relating to the robot arm 51A and robot arm 51B unless otherwise specified, and the state of a line (robot 51C, third conveying machine 52C, and sorting container board 55) for exception treatment shall not be considered.

The sorting container control unit 17 performs control related to the unloading and loading (replenishment) of the sorting container 8. In the example shown in FIG. 3, if a predetermined condition is satisfied, the sorting container control unit 17 control, based on the control signal S2, the sorting container replenishing machine 53 and the sorting container board 54 to thereby transfer the sorting container 8 on the sorting container board 54 onto the second conveying machine 52B and load a new sorting container 8 on the sorting container board 54.

In the first example of unloading and loading of the sorting container 8, if there is such a sorting container 8 in a state (also referred to as "reference state") that it is full and cannot house any further item 7, the sorting container control unit 17 recognizes the sorting container 8 in the reference state as a target to be unloaded. Then, the sorting container control unit 17 performs control to transfer the sorting container 8 onto the second conveying machine 52B and load a new sorting container 8 for replenishment. In this case, the sorting container control unit 17 may determine whether or not the sorting container 8 becomes in the reference state, based on the measurement signal S1 from the measurement device 4 or based on the progress of the operation plan formulated by the robot control unit 14. In the former determination approach, for example, based on the measurement signal S1, the sorting container control unit 17 recognizes the type of the items 7 and the number of items 7 housed in the sorting container 8 of interest to thereby determine whether or not the number has reached the accommodation upper limit number corresponding to the recognized type. In this case, for example, in the memory 12 or the like, information regarding the accommodation upper limit number of the sorting container 8 for each type of items 7 described above is stored in advance. In the latter determination approach, based on the progress of the operation plan formulated by the operation planning unit 15, the sorting container control unit 17 estimates the type and the number of items 7 placed in the sorting container 8 at the current time. Then, by comparing the estimation result with the accommodation upper limit number, the sorting container control unit 17 determines whether or not the sorting container 8 is in the reference state.

In the second example of unloading and loading of the sorting container 8, if an item to be sorted falls under a new class which does not correspond to any of the sorting containers 8A to 8D on the sorting container board 54, the sorting container control unit 17 determines that there are no candidates of the sorting destination of the item 7. In this case, for example, if the sorting container control unit 17 determines, based on the identification information, supplied from the BCR 42, of the item 7 to be sorted and the sorting information IB, that the class of the item 7 is different from the classes of the items 7 placed in the sorting containers 8A to 8D (and that any of the sorting containers 8A to 8D is not empty), the sorting container control unit 17 determines that there are no candidates of the sorting destination. Then, the sorting container control unit 17 performs the control of transferring one of the sorting containers 8A to 8D to the second conveying machine 52B and loading a new sorting container 8 by the sorting container replenishing machine 53. In this case, for example, the sorting container control unit 17 selects, as the target to be transferred to the second conveying machine 52B, the sorting container 8 with the maximum storage rate (i.e., the ratio of the actual accommodation number to the accommodation upper limit number) of the items 7 or the maximum storage number of the items 7 among the sorting containers 8A to 8D. Accordingly, the sorting container control unit 17 can suitably control the unloading and loading of the sorting container 8 so that sorting the items 7 is appropriately performed while reducing the number of the sorting containers 8 to be used as less as possible.

The above-described determination process of unloading and loading of the sorting container 8 may be executed when the operation planning unit 15 sets the objective task. In this case, in response to the request of the unloading and loading of the sorting container 8 from the operation planning unit 15, the sorting container control unit 17 unloads and replenishes the sorting container 8. The determination of necessity of unloading and loading (replenishment) will be described later with reference to FIG. 6.

Here, for example, each component of the robot control unit 14, the operation planning unit 15, the determination unit 16 and the sorting container control unit 17 can be realized by the processor 11 executing a program. In addition, the necessary program may be recorded in any non-volatile storage medium and installed as necessary to realize the respective components. In addition, at least a part of these components is not limited to being realized by a software program and may be realized by any combination of hardware, firmware, and software. At least some of these components may also be implemented using user-programmable integrated circuitry, such as FPGA (Field-Programmable Gate Array) and microcontrollers. In this case, the integrated circuit may be used to realize a program for configuring each of the above-described components. Further, at least a part of the components may be configured by a ASSP (Application Specific Standard Produce), ASIC (Application Specific Integrated Circuit) and/or a quantum processor (quantum computer control chip). In this way, each component may be implemented by a variety of hardware. The above is true for other example embodiments to be described later. Further, each of these components may be realized by the collaboration of a plurality of computers, for example, using cloud computing technology.

(5) Details of Operation Planning

Next, the details of the operation planning regarding the robot 51 by the operation planning unit 15 will be described. In the following, as an example, an approach for generating an operation sequence that is a time-step sequence of subtasks for each of the robot 51 based on the target state represented by temporal logic will be described.

(5-1) Application Information

First, a description will be given of the data structure of the application information IA used in operation planning by the operation planning unit 15.

Figure 5:
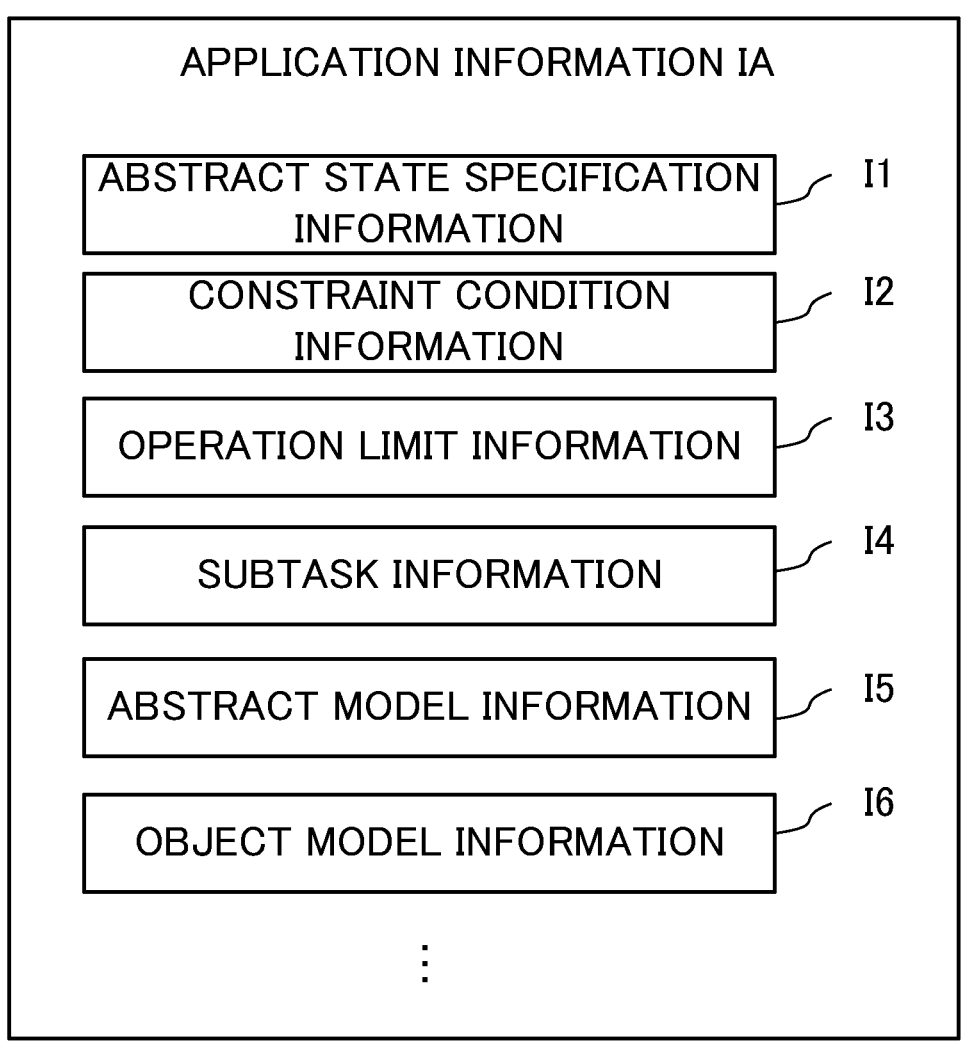
FIG. 5 It is an example of the data structure of application information.

FIG. 5 illustrates an example of the data structure of the application information IA. As shown in FIG. 5, the application information IA includes abstract state specification information I1, constraint condition information I2, operation limit information I3, subtask information I4, abstract model information I5, and object model information I6.

The abstract state specification information I1 specifies an abstract state to be defined in order to generate the operation sequence. The above-mentioned abstract state is an abstract state of an object in the workspace, and is defined as a proposition to be used in the target logical formula to be described later.

The constraint condition information I2 indicates constraint conditions at the time of performing the objective task. The constraint condition information I2 indicates, for example, a constraint that the robot 51 (robot arms) must not be in contact with an obstacle when the objective task is pick-and-place, and a constraint that the robot arms must not be in contact with each other, and the like.

The operation limit information I3 indicates information on the operation limit of the robot 51 to be controlled by the control device 1. The operation limit information I3 is information, for example, defining the upper limits of the speed, the acceleration, and the angular velocity of the robot 51. It is noted that the operation limit information I3 may be information defining the operation limit for each movable portion or joint of the robot 51.

The subtask information I4 indicates information on subtasks that the robot 51 can accept. For example, when the objective task is pick-and-place, the subtask information I4 defines a subtask "reaching" that is the movement of a robot arm of the robot 51, and a subtask "grasping" that is the grasping by the robot arm.

The abstract model information I5 is information on an abstract model in which the dynamics in the workspace are abstracted. For example, an abstract model is represented by a model in which real dynamics are abstracted by a hybrid system, as will be described later. The abstract model Information I5 includes information indicative of the switching conditions of the dynamics in the above-mentioned hybrid system. For example, in the case of pick-and-place in which the robot 51 grasps a target object and then place it on a predetermined position, one of the switching conditions is that the target object cannot be moved unless it is gripped by the hand of the robot arm.

The object model information I6 is information on the object model of each object in the workspace to be recognized from the measurement signal S1 generated by the measurement device 4. Examples of the above-described each object include the robot 51, an obstacle, a tool and any other object handled by the robot 51, a working body other than the robot 51. The object model information I6 includes, for example, information required for the control device 1 to recognize the type, position, posture, currently-executed operation, and the like of the described above each object, and three-dimensional shape information such as CAD (Computer Aided Design) data for recognizing the three-dimensional shape of each object. The former information includes the parameters of an inference engine obtained by training a learning model that is used in a machine learning such as a neural network. For example, the above-mentioned inference engine is preliminarily trained to output the type, the position, the posture, and the like of an object shown in the image when an image is inputted thereto.

The application information IA may store various information related to the generating process of the operation sequence in addition to the above-described information.

(5-2) Functional Blocks of Operation Planning Unit

Figure 6:
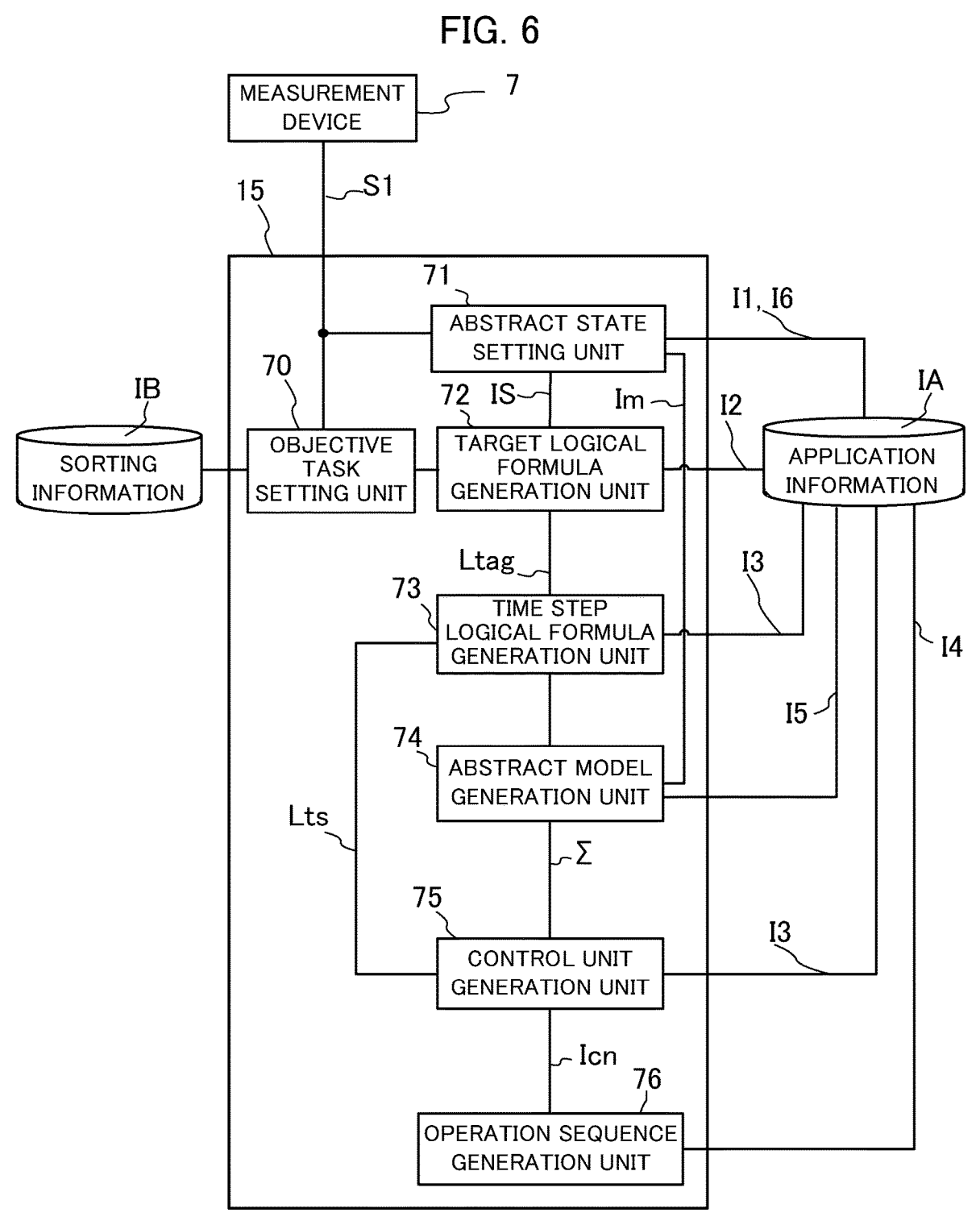

FIG. 6 is an example of functional blocks showing an outline of the process executed by the operation planning unit 15. The operation planning unit 15 functionally includes an objective task setting unit 70, an abstract state setting unit 71, a target logical formula generation unit 72, a time step logical formula generation unit 73, an abstract model generation unit 74, a control input generation unit 75, and an operation sequence generation unit 76.

The objective task setting unit 70 sets the objective task based on the measurement signal S1 supplied from the measurement device 4 and the sort information IB. In this case, the objective task setting unit 70 determines the items 7 to be sorted and the sorting containers 8 to be the sorting destinations of the items 7.

The abstract state setting unit 71 sets the abstract states in the workspace on the basis of the measurement signal S1 supplied from the measurement device 4, the abstract state specification information I1, and the object model information I6. In this instance, the abstract state setting unit 71 recognizes objects (e.g., items 7, sorting containers 8) in the workspace that need to be considered in the work of the robot 51 and generates a recognition result "Im" related to the objects. The abstract state setting unit 71 defines a proposition for expressing each abstract state that needs to be considered in the work of the robot 51 by logical formula based on the recognition result Im. The abstract state setting unit 71 supplies information (also referred to as "abstract state setting information IS") representing the set abstract states to the target logical formula generation unit 72.

Based on the abstract state setting information IS, the target logical formula generation unit 72 converts the objective task into a logical formula (also referred to as "target logical formula Ltag") in the form of temporal logics representing the final state to be achieved. In this case, by referring to the constraint condition information I2 of the application information IA, the target logical formula generation unit 72 adds the constraint conditions to be satisfied in executing the objective task to the target logical formula Ltag. The target logical formula generation unit 72 supplies the generated target logical formula Ltag to the time step logical formula generation unit 73.

The time step logical formula generation unit 73 converts the target logical formula Ltag supplied from the target logical formula generation unit 72 into a logical formula (also referred to as "time step logical formula Lts") representing the states at every time step. The time step logical formula generation unit 73 supplies the generated time step logical formula Lts to the control input generation unit 75.

The abstract model generation unit 74 generates an abstract model "Σ" in which the real dynamics in the workspace is abstracted based on the abstract model information I5 of the application information IA and the recognition result Im supplied from the abstract state setting unit 71. In this case, the abstract model generation unit 74 considers the target dynamics as a hybrid system in which continuous dynamics and discrete dynamics are mixed, and generates the abstract model Σ based on the hybrid system. The method of generating the abstract model Σ will be described later. The abstract model generation unit 74 supplies the generated abstract model Σ to the control input generation unit 75.

The control input generation unit 75 determines a control input to the robot 51 for each time step so that the time step logic formula Lts supplied from the time step logical formula generation unit 73 and the abstract model Σ supplied from the abstract model generation unit 74 are satisfied and so that the evaluation function (e.g., a function representing the amount of energy consumed by the robot) is optimized. The control input generation unit 75 supplies information (also referred to as "control input information Icn") indicating the control input to the robot 51 at each time step to the operation sequence generation unit 76.

The operation sequence generation unit 76 generates an operation sequence which is a sequence of subtasks on the basis of the control input information Icn supplied from the control input generation unit 75 and the subtask information I4 of the application information IA and supplies the operation sequence to the robot 51.

(5-3) Objective Task Setting Unit

The objective task setting unit 70 determines an item 7 to be sorted and a sorting container 8 to be the sorting destination of the item 7, and sets the objective task of moving, by pick-and-place, the item 7 to be sorted into the sorting container 8 that is the sorting destination.

Here, a description will be given of a method of determining an item 7 to be sorted and a sorting container 8 to be the sorting destination thereof. First, for example, the objective task setting unit 70 identifies an item 7 that has passed through the BCR 42 as the item 7 to be sorted, and performs sorting classification (for example, classification by type or by lot) of the item 7 on the basis of the reading result of the identified item 7 by the BCR 42 and the sorting information IB. For example, if the sorting information IB indicates a correspondence relation between the ID of the item 7 and the class to be used in sorting, the objective task setting unit 70 recognizes the sorting class of the item 7 based on the ID of the item 7 read by the BCR 42 and the above-described correspondence relation. When the information read by the BCR 42 indicates the sorting class of the items 7, the objective task setting unit 70 recognizes the sorting class of the item 7 to be sorted based on the reading result from the BCR 42 without using the sorting information IB.

Next, a specific example of a method of determining the sorting container 8 to be the sorting destination based on the classification of the target item 7 to be sorted will be described by division into cases. For example, if one or more items 7 having the same sorting destination (i.e., the same class) as the target item 7 to be sorted are already placed in one of the sorting containers 8, the objective task setting unit 70 sets the one of the sorting containers 8 as the sorting destination of the target item 7. Here, for example, the objective task setting unit 70 specifies each class of the items 7 already placed in the sorting containers 8 based on the recognition result of each class of the items 7 at the time of formulating the past operation plans. The countermeasure for such a case that the sorting container 8 identified as the sorting destination is a reference state will be described later.

In addition, if the objective task setting unit 70 determines that there is no item 7 in any sorting container 8 having the same sorting destination as the target item 7 to be sorted and that there is an empty sorting container 8, the objective task setting unit 70 determines the sorting destination of the target item 7 to be the empty sorting container 8.

Further, if the objective task setting unit 70 determines that there is no item 7 in any sorting container 8 having the same sorting destination as the target item 7 to be sorted and that there is no empty sorting container 8, the objective task setting unit 70 determines that it is necessary to unload one of the sorting containers 8 and load a new sorting container 8. Therefore, in this case, the objective task setting unit 70 supplies a request signal of unloading and loading relating to the sorting container 8 to the sorting container control unit 17. Then, if the objective task setting unit 70 detects, based on the measurement signal S1 or a replenishment completion notification from the sorting container replenishing machine 53, that an empty sorting container 8 is loaded, the objective task setting unit 70 determines the sorting destination of the target item 7 to be the loaded empty sorting container 8.

Further, if items 7 having the same sorting destination as the target item 7 to be sorted are already placed in one of the sorting containers 8 and the one of the sorting containers 8 is in the reference state, the objective task setting unit 70 determines that it is necessary to unload and load the sorting container 8. Therefore, in this case, the objective task setting unit 70 supplies the sorting container control unit 17 with a request signal of unloading the sorting container 8 in the reference state and loading a new sorting container 8. Then, if the objective task setting unit 70 detects, based on the measurement signal S1 or a replenishment completion notification from the sorting container replenishing machine 53, that an empty sorting container 8 is loaded, the objective task setting unit 70 determines the sorting destination of the target item 7 to be the loaded empty sorting container 8. It is noted that, in such a case where there is an empty sorting container 8, the objective task setting unit 70 sets the objective task which designates the empty sorting container 8 as the sorting destination and proceeds to the formulation of the operation plan without waiting for the above-described unloading and loading.

If the identification information (ID) is assigned to each sorting container 8 and the class (type or lot number) of the items 7 to be placed in each sorting container 8 is designated in the sorting information IB, the objective task setting unit 70 recognize the sorting container 8 to be the sort destination, based on the information read from the bar code of the target item 7 to be sorted and the sorting information IB. In this case, each sorting container 8 is equipped with an AR marker or the like and thereby the unique identification information (ID) is identifiable based on the measurement by the camera 41 or the like.

Then, the objective task setting unit 70 supplies the determination result of the target item 7 to be sorted and the sorting container 8 to be the sorting destination of the targe item 7 to the target logical formula generation unit 72 and the like as information regarding the objective task. Thus, an operation plan is established for each set objective task, and an operation sequence of the robot 51 for the target item 7 to be sorted is sequentially generated. Instead of setting the objective task for each item 7 that has passed through the BCR 42, the objective task setting unit 70 may set the objective task for one or more items 7 that has passed through the BCR 42 at a predetermined cycle period (for example, a cycle period of seconds). In this instance, the control device 1 may stop the conveyance by the first conveying machine 52A at the time of operation planning and the time of operation of the robot 51. In this instance, for example, the control device 1 repeatedly executes a cycle of: establishment of an operation plan; operation of the robot 51 based on the operation plan; and conveyance for a predetermined period by the first conveying machine 52A.

(5-4) Abstract State Setting Unit

First, the abstract state setting unit 71 generates the recognition result Im by referring to the object model information I6 and analyzing the measurement signal S1 which is the output signal from the external sensor such as the camera 41 by a technique of recognizing the environment of the workspace. The above-described technique of recognizing the environment of the workspace may be any technique such as an image processing technique, an image recognition technique, a speech recognition technique, and a technique using a RFID (Radio Frequency Identifier). The recognition result Im includes information regarding the type, position, and posture of each object (including the target item 7 to be sorted) in the workspace. Examples of the object in the workspace include the robot 51, the items 7, obstacles, and other working bodies (a person or any other worker other than the robot 51). For example, if the BCR 42 reads the bar code of an item 7, the abstraction condition setting unit 71 recognizes, as the target item 7 to be sorted, an item 7 existing at a position where the BCR 42 can read the bar code thereof.

Next, the abstract state setting unit 71 sets the abstract states in the workspace based on the recognition result Im and the abstract state specification information I1 of the application information IA. In this case, first, the abstract state setting unit 71 refers to the abstract state specification information I1 and recognizes the abstract states to be set in the workspace.

Figure 7:
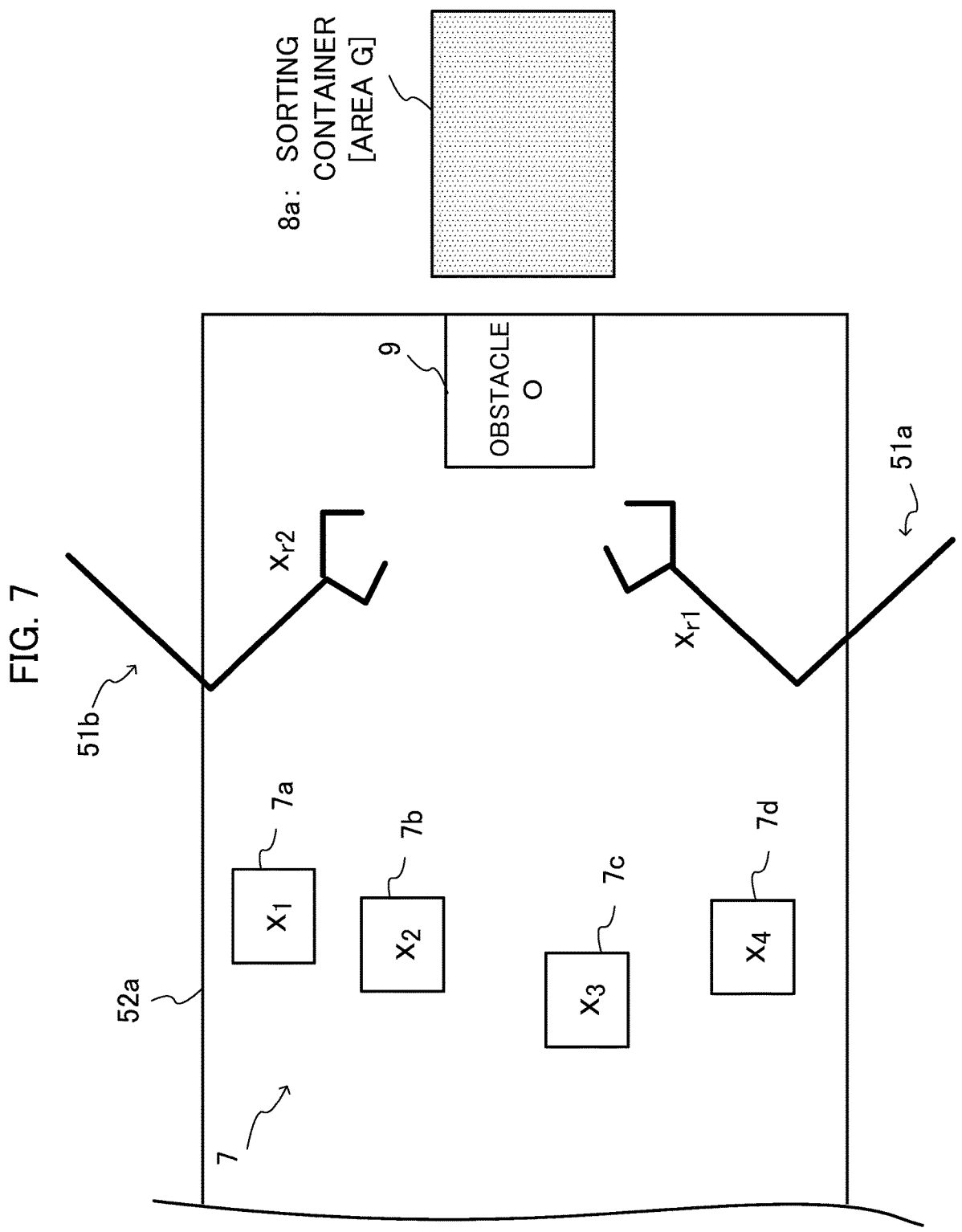
FIG. 7 It is an example of a bird's-eye view of a workspace of a pick-and-place that is a simplified work of sorting separated parts shown in FIG. 3.

FIG. 7 shows a bird's-eye view of the workspace of pick-and-place which is a simplified work of parts-sorting work shown in FIG. 3. In the workspace shown in FIG. 7, there are two robot arms 51a and 51b, four items 7 (7a to 7d) mounted on the conveying machine 52a, an obstacle 9, and a sorting container 8a which is the destination of the items 7. Thus, in FIG. 7, the sorting container 8 is one for simplicity of explanation. Hereafter, the inner area of the sorting container 8a on which the items 7 should be placed is also referred to as "area G". The robot arms 51a and 51b are examples of the "first robot" and the "second robot", respectively.

In this case, first, the abstract state setting unit 71 recognizes the states of the items 7, the existence range of the obstacle 9, the state of the robot 51, the existence range of the area G, and the like.

Here, the abstract state setting unit 71 recognizes the position vectors "$x_1$" to "$x_4$" of the respective centers of the items 7a to 7d as the positions of the items 7a to 7d. The abstract state setting unit 71 recognizes the position vector "$x_{r1}$" of the robot hand of the robot arm 51a and the position vector "$x_{r2}$" of the robot hand of the robot arm 51b as the positions of the robot arm 51a and the robot arm 51b. If the items 7a to 7d are conveyed by the conveying machine 52a at a predetermined conveying speed, the abstract state setting unit 71 may represent the position vectors $x_1$ to $x_4$ by a predetermined model (function) that uses the initial positions indicated by the recognition result Im, the transport speed of the conveying machine 52a, and the elapsed time from the initial positions as parameters. The information regarding the above-described model (function) is previously included in the application information IA, for example. Further, when the control device 1 stops the conveying by the conveying machine 52a during operation planning and the operation of the robot 51, the abstract state setting unit 71 defines the position vectors $x_1$ to $x_4$ as fixed values based on the recognition result Im.

Similarly, the abstract state setting unit 71 recognizes the postures of the items 7a to 7d, the existence range of the obstacle 9, the existence range of the are G, and the like. If the abstract state setting unit 71 regards the obstacle 9 as a rectangular parallelepiped and the area G as a rectangle, the abstract state setting unit 71 recognizes the position vectors of respective vertices of the obstacle 9 and the area G.

The abstract state setting unit 71 determines the abstract states to be defined in the objective task by referring to the abstract state specification information I1. In this instance, the abstract state setting unit 71 determines propositions indicating the abstract states, based on the recognition result Im (e.g., the number of objects for each type) relating to the objects existing in the workspace and the abstract state specification information I1.

In the example shown in FIG. 7, the abstract state setting unit 71 adds identification labels "1" to "4" to items 7a to 7d specified by the recognition result Im, respectively. The abstract state setting unit 71 defines a proposition "$g_i$" that the item "i" (i=1 to 4) is present in the area G which is the goal point to be finally placed. Further, the abstract state setting unit 71 adds an identification label "O" to the obstacle 9, and defines a proposition "$o_i$" that the item i interferes with the obstacle O. Furthermore, the abstract state setting unit 71 defines the proposition "h" that the robot arms 51a and 51b interfere with each other.

In this way, the abstract state setting unit 71 recognizes the abstract states to be defined by referring to the abstract state specification information I1, and defines propositions representing the abstract states ($g_1$, $o_i$, h in the above-described example) according to the number of items 7, the number of robots 51, the number of obstacles 9, etc., respectively. The abstract state setting unit 71 supplies information indicating the propositions representing the abstract states to the target logical formula generation unit 72 as an abstract state setting information IS.

(5-5) Target Logical Formula Generation Unit

First, the target logical formula generation unit 72 converts the objective task set by the objective task setting unit 70 into a logical formula using a temporal logic. For example, in the example of FIG. 7, it is herein assumed that the objective task "the item (i=2) finally exists in the area G" is given. In this case, the target logical formula generation unit 72 generates the logical formula "$\Diamond g_2$" which represents the objective task by using the operator "$\Diamond$" corresponding to "eventually" of the linear logical formula (LTL: Linear Temporal Logic) and the proposition "$g_1$" defined by the abstract state setting unit 71. The target logical formula generation unit 72 may express the logical formula by using any operators according to the temporal logic other than the operator "$\Diamond$" such as logical AND "$\land$", logical OR "$\lor$", negative "$\lnot$", logical implication "$\Rightarrow$", always "$\Box$", next "$\circ$", and until "U". The logical formula may be expressed by any temporal logic other than linear temporal logic such as MTL (Metric Temporal Logic) and STL (Signal Temporal Logic).

Next, the target logical formula generation unit 72 generates the target logical formula Ltag by adding the constraint conditions indicated by the constraint condition information I2 to the logical formula indicating the objective task.

For example, provided that two constraint conditions "a robot arm does not interfere with another robot arm" and "the item i does not interfere with the obstacle O" for pick-and-place shown in FIG. 7 are included in the constraint condition information I2, the target logical formula generation unit 72 converts these constraint conditions into the logical formula. Specifically, the target logical formula generation unit 72 converts the above-described two constraint conditions into the following logical formulas, respectively, using the proposition "$o_i$" and the proposition "h" defined by the abstract state setting unit 71 in the case shown in FIG. 7.

$$\Box\lnot h$$

$$\land_i \Box\lnot o_i$$

Therefore, in this case, the target logical formula generation unit 72 generates the following target logical formula Ltag obtained by adding the logical formulas of these constraint conditions to the logical formula "$\Diamond g_2$" corresponding to the objective task "the item (i=2) finally exists in the area G".

$$(\Diamond g_2) \land (\Box\lnot h) \land (\land_i \Box\lnot o_i)$$

In practice, the constraint conditions corresponding to the pick-and-place is not limited to the above-described two constraint conditions and there are other constraint conditions such as "a robot arm does not interfere with the obstacle O", "plural robot arms do not grasp the same item", "items does not contact with each other". Such constraint conditions are also stored in the constraint condition information I2 and are reflected in the target logical formula Ltag.

(5-6) Time Step Logical Formula Generation Unit

The time step logical formula generation unit 73 determines the number of time steps (also referred to as the "target time step number") needed to complete the objective task, and determines possible combinations of propositions representing the states at every time step such that the target logical formula Ltag is satisfied with the target time step number. Since the combinations are normally plural, the time step logical formula generation unit 73 generates the time step logical formula Lts that is a logical formula obtained by combining these combinations by logical OR. Each of the combinations described above is a candidate of a logical formula representing a sequence of operations to be instructed to the robot 51, and therefore it is hereinafter also referred to as "candidate φ".

Here, a description will be given of a specific example of the process executed by the time step logical formula generation unit 73 in the case where the objective task "the item (i=2) finally exists in the area G" exemplified in FIG. 7 is set.

In this instance, the following target logical formula Ltag is supplied from the target logical formula generation unit 72 to the time step logical formula generation unit 73.

$$(\Diamond g_2) \land (\Box\lnot h) \land (\land_i \Box\lnot o_i)$$

In this case, the time-step logical formula generation unit 73 uses the proposition "$g_{i,k}$" that is the extended proposition "$g_i$" to include the concept of time steps. Here, the proposition "$g_{i,k}$" is the proposition "the item i exists in the area G at the time step k". Here, when the target time step number is set to "3", the target logical formula Ltag is rewritten as follows.

$$(\Diamond g_{2,3}) \land (\land_{k=1,2,3} \Box\lnot h_k) \land (\land_{i,k=1,2,3} \Box\lnot o_{i,k})$$

$\Diamond g_{2,3}$ can be rewritten as shown in the following expression.

[Formula 1]

$$\Diamond g_{2,3} = (\neg g_{2,1} \wedge \neg g_{2,2} \wedge g_{2,3}) \vee$$

$$(\neg g_{2,1} \wedge g_{2,2} \wedge g_{2,3}) \vee (g_{2,1} \wedge \neg g_{2,2} \wedge g_{2,3}) \vee (g_{2,1} \wedge g_{2,2} \wedge g_{2,3})$$

The target logical formula Ltag described above is represented by logical OR ($\varphi_1 \vee \varphi_2 \vee \varphi_3 \vee \varphi_4$) of four candidates "$\varphi_1$" to "$\varphi_4$" as shown in below.

[Formula 2]

$$\phi_1 = (\neg g_{2,1} \wedge \neg g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_2 = (\neg g_{2,1} \wedge g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_3 = (g_{2,1} \wedge \neg g_{2,2} \wedge g_{2,3}) \wedge (\wedge_{k=1,2,3} \Box \neg h_k) \wedge (\wedge_{i,k=1,2,3} \Box \neg o_{i,k})$$

$$\phi_4 = (g_{2,1} \wedge g_{2,2} \wedge g_{2,3}) \wedge (\wedge_{k=1,2,3} \Box \neg h_k) \wedge (\wedge_{i,k=1,2,3} \Box \neg o_{i,k})$$

Therefore, the time step logical formula generation unit 73 determines the time step logical formula Lts to be the logical OR of the four candidates $\varphi_1$ to $\varphi_4$. In this case, the time step logical formula Lts is true if at least one of the four candidates $\varphi_1$ to $\varphi_4$ is true.

Next, a supplementary description will be given of a method of setting the target time step number.

For example, the time step logical formula generation unit 73 determines the target time step number based on the prospective work time specified by the instruction signal D1 supplied from the instruction device 2. In this case, the time step logical formula generation unit 73 calculates the target time step number based on the prospective work time described above and the information on the time width per time step stored in the memory 12 or the storage device 4. In another example, the time step logical formula generation unit 73 stores in advance in the memory 12 or the storage device 4 information in which a suitable target time step number is associated with each type of objective task, and determines the target time step number in accordance with the type of objective task to be executed by referring to the information.

In some embodiments, the time step logical formula generation unit 73 sets the target time step number to a predetermined initial value. Then, the time step logical formula generation unit 73 gradually increases the target time step number until the time step logical formula Lts which enables the control input generation unit 75 to determine the control input is generated. In this case, if the control input generation unit 75 ends up not being able to derive the optimal solution in the optimization processing with the set target time step number, the time step logical formula generation unit 73 adds a predetermined number (1 or more integers) to the target time step number.

(5-7) Abstract Model Generation Unit

The abstract model generation unit 74 generates the abstract model $\Sigma$ based on the abstract model information I5 and the recognition result Im. Here, in the abstract model information I5, information required to generate the abstract model $\Sigma$ is recorded for each type of objective task. For example, a general-purpose abstract model is recorded in the abstract model information I5, wherein the positions and/or the number of the items, the position of the area where the items are to be placed, the number of robots 51, and the like are not specified in the general-purpose abstract model. The abstract model generation unit 74 generates the abstract model $\Sigma$ by reflecting the recognition result Im in the general-purpose abstract model which includes the dynamics of the robot 51 and which is recorded in the abstract model information I5. Thereby, the abstract model 2 is set to a model in which the states of objects existing in the workspace and the dynamics of the robot 51 are abstractly expressed. The states of the objects existing in the workspace indicate the position and the number of the items, the position of the area (sorting container 8) where the items are to be placed, the number of robots 51, and the like.

When there are one or more other working bodies to be controlled other than the robot 51, information on the abstracted dynamics of the other working bodies may be included in the abstract model information I5. In this case, the abstract model $\Sigma$ is a model in which the states of the objects being in the workspace, the dynamics of the robot 51, and the dynamics of the other working bodies are abstractly expressed.

Here, at the time of work of the objective task by the robot 51, the dynamics in the workspace is frequently switched. For example, while the robot arm is gripping the item i, the item i can be moved. However, if the robot arm is not gripping the item i, the item i cannot be moved.

In view of the above, in the present example embodiment, the operation of grasping the item i is abstractly expressed by the logical variable "$\delta_i$". In this case, for example, the abstract model generation unit 74 can define the abstract model $\Sigma$ to be set for the workspace shown in FIG. 7 as the following equation (1).

[Formula 3]

$$\begin{bmatrix} x_{r1} \\ x_{r2} \\ x_1 \\ \vdots \\ x_4 \end{bmatrix}_{k+1} = I \begin{bmatrix} x_{r1} \\ x_{r2} \\ x_1 \\ \vdots \\ x_4 \end{bmatrix}_k + \begin{bmatrix} I & 0 \\ 0 & I \\ \delta_{1,1}I & \delta_{2,1}I \\ \vdots & \vdots \\ \delta_{1,4}I & \delta_{2,4}I \end{bmatrix} \begin{bmatrix} u_1 \\ u_2 \end{bmatrix} \quad (1)$$

$$h_{ij_{min}}(1 - \delta_i) \leq h_{ij}(x) \leq h_{ij_{max}}\delta_i + (\delta_i - 1)\varepsilon$$

Here, "$u_j$" indicates a control input for controlling the robot hand j ("j=1" is the robot hand of the robot arm 51$a$, "j=2" is the robot hand of the robot arm 51$b$), and "I" indicates a unit matrix and "0" indicates zero (null) matrix. It is noted that the control input is herein assumed to be a speed as an example but it may be an acceleration. Further, "$\delta j, i$" is a logical variable that is set to "1" when the robot hand j grasps the item i and is set to "0" in other cases. Each of "$x_{r1}$" and "$x_{r2}$" indicates the position vector of the robot hand j (j=1, 2), and each of "$x_1$" to "$x_4$" indicates the position vector of the item i (i=1 to 4). Further, "h (x)" is a variable to be "h (x)>=0" when the robot hand exists in the vicinity of an item to the extent that it can grasp the item, and satisfies the following relationship with the logical variable $\delta$.

$$\delta = 1 \iff h(x) \geq 0$$

In the above expression, when the robot hand exists in the vicinity of an item to the extent that the item can be grasped, it is considered that the robot hand grasps the item, and the logical variable $\delta$ is set to 1.

Here, the equation (1) is a difference equation showing the relationship between the states of the objects at the time step k and the states of the objects at the time step k+1. Then, in the above equation (1), the state of grasping is represented by a logical variable that is a discrete value, and the movement of the item is represented by a continuous value. Accordingly, the equation (1) shows a hybrid system.

The equation (1) considers not the detailed dynamics of the entire robot 51 but only the dynamics of the robot hand, which is the hand of the robot 51 that actually grasps a item. Thus, it is possible to suitably reduce the calculation amount of the optimization process by the control input generation unit 75.

Further, the abstract model information I5 includes: information for deriving the difference equation indicated by the equation (1) from the recognition result Im; and the logical variable corresponding to the operation (the operation of grasping the item i in the case of pick-and-place) causing the dynamics to switch. Thus, even when there is a variation in the position and the number of the items, the area (sorting container 8) where the items are to be placed and the number of the robots 51 and the like, the abstract model generation unit 74 can determine the abstract model Σ in accordance with the environment of the target workspace based on the abstract model information I5 and the recognition result Im.

It is noted that, in place of the model shown in the equation (1), the abstract model generation unit 74 may generate any other hybrid system model such as mixed logical dynamical (MLD) system and a combination of Petri nets and automaton.

(5-8) Control Input Generation Unit

The control input generation unit 75 determines the optimal control input for the robot 51 with respect to each time step based on the time step logical formula Lts supplied from the time step logical formula generation unit 73 and the abstract model Σ supplied from the abstract model generation unit 74. In this case, the control input generation unit 75 defines an evaluation function for the objective task and solves the optimization problem of minimizing the evaluation function while setting the abstract model Σ and the time step logical formula Lts as constraint conditions. For example, the evaluation function is predetermined for each type of the objective task and stored in the memory 12 or the storage device 4.

For example, when the objective task is pick-and-place, the control input generation unit 75 determines the evaluation function such that the control input "$u_k$" and the distance "$d_k$" between the item to be carried and the goal point of the item are minimized (i.e., the energy spent by the robot 51 is minimized). The distance $d_k$ described above corresponds to the distance between the item (i=2) and the area G when the objective task is "the item (i=2) finally exists in the area G".

In this case, the control input generation unit 75 determines the evaluation function to be the sum of the square of the distance $d_k$ and the square of the control input $u_k$ in all time steps. Then, the control input generation unit 75 solves the constrained mixed integer optimization problem shown in the following expression (2) while setting the abstract model Σ and the time-step logical formula Lts (that is, the logical OR of the candidates $\varphi_i$) as the constraint conditions.

[Formula 4]

$$\min_u \left( \sum_{k=0}^{T} \left( \|d_k\|_2^2 + \|u_k\|_2^2 \right) \right) \quad (2)$$

s.t. Σ

$\lor \phi_i$

Here, "T" is the number of time steps to be set in the optimization and it may be a target time step number or may be a predetermined number smaller than the target time step number as described later. In some embodiments, the control input generation unit 75 approximates the logical variable to a continuous value (i.e., solve a continuous relaxation problem). Thereby, the control input generation unit 75 can suitably reduce the calculation amount. When STL is adopted instead of linear temporal logic (LTL), it can be described as a nonlinear optimization problem. By such optimization, the control input to define the operations of the robots 51 including the handover of the item 7 between the robots 51 as required is determined.

Further, if the target time step number is large (e.g., larger than a predetermined threshold value), the control input generation unit 75 may set the time step number T in the expression (2) used for optimization to a value (e.g., the threshold value described above) smaller than the target time step number. In this case, the control input generation unit 75 sequentially determines the control input $u_k$ by solving the optimization problem based on the expression (2), for example, every time a predetermined number of time steps elapses.

In some embodiments, the control input generation unit 75 may solve the optimization problem based on the expression (2) for each predetermined event corresponding to the intermediate state for the accomplishment state of the objective task and determine the control input $u_k$ to be used. In this case, the control input generation unit 75 determines the time step number T in the expression (2) to be the number of time steps up to the next event occurrence. The event described above is, for example, an event in which the dynamics switches in the workspace 6. For example, when pick-and-place is the objective task, examples of the event include "the robot 51 grasps the item" and "the robot 51 finishes carrying one of the items to the destination (goal) point." For example, one or more events are predetermined, and information indicative of the events is stored in the storage device 4.

(5-9) Operation Sequence Generation Unit

The operation sequence generation unit 76 generates the operation sequence based on the control input information Icn supplied from the control input generation unit 75 and the subtask information I4 stored in the application information storage unit 41. In this case, by referring to the subtask information I4, the operation sequence generation unit 76 recognizes subtasks that the robot 51 can accept and converts the control input for every time step indicated by the control input information Icn into subtasks.

For example, in the subtask information I4, there are defined functions representing two subtasks, the movement (reaching) of the robot hand and the grasping by the robot hand, as subtasks that can be accepted by the robot 51 when the objective task is pick-and-place. In this case, the function "Move" representing the reaching is, for example, a function that uses the following three arguments (parameters): the initial state of the robot 51 before the function is executed; the final state of the robot 51 after the function is executed; and the time to be required for executing the function. In addition, the function "Grasp" representing the grasping is, for example, a function that uses the following these arguments: the state of the robot 51 before the function is executed; the state of the item to be grasped before the function is executed; and the logical variable δ. Here, the function "Grasp" indicates performing a grasping operation when the logical variable δ is "1", and indicates performing a releasing operation when the logical variable δ is "0". In this case, the operation sequence generation unit 76 determines the function "Move" based on the trajectory of the robot hand determined by the control input for every time step indicated by the control input information Icn, and determines the function "Grasp" based on the transition of the logical variable δ in units of time step indicated by the control input information Icn.

Then, the operation sequence generation unit 76 generates the operation sequence configured by the function "Move" and the function "Grasp", and supplies the operation sequence to the robot 51. For example, if the objective task is "the item (i=2) finally exists in the area G", the operation sequence generation unit 76 generates the operation sequence of the function "Move", the function "Grasp", the function "Move", and the function "Grasp" for the robot hand closest to the item (i=2). In this case, the robot hand closest to the item (i=2) moves to the position of the item (i=2) by the function "Move" for the first time, grasps the item (i=2) by the function "Grasp" for the first time, moves to the area G by the function "Move" for the second time, and places the item (i=2) in the area G by the function "Grasp" for the second time.

(6) Process Flow

Figure 8:
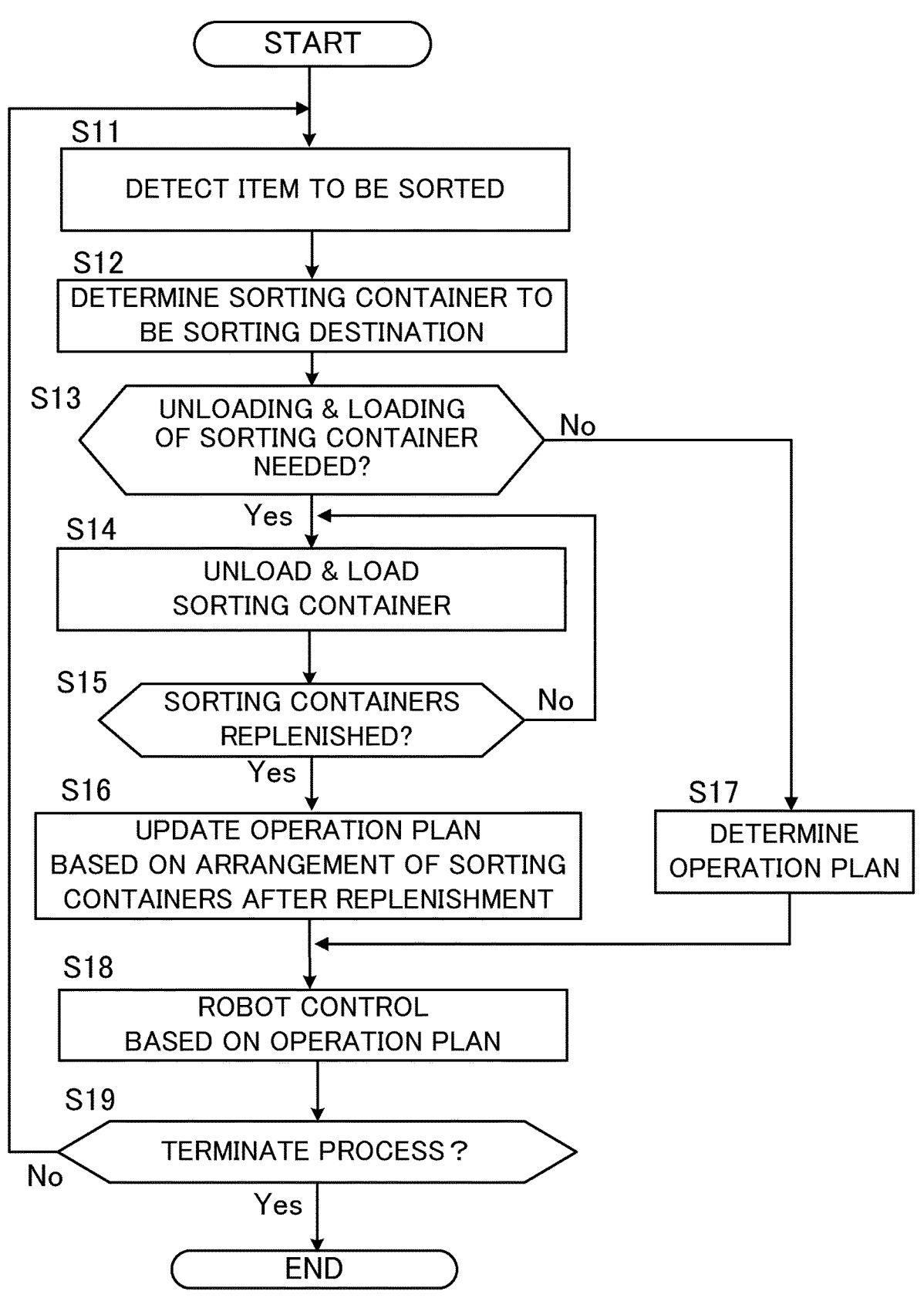
FIG. 8 It is an example of a flowchart showing an outline of a robot control process that the control device executes in the first example embodiment.

FIG. 8 is an example of a flowchart showing an outline of a process to be executed by the control device 1 in the first example embodiment.

First, the control device 1 detects an item 7 to be sorted (step S11). In this instance, for example, the control device 1 detects an item 7 existing in the predetermined area as the target item 7 to be sorted based on the measurement signal S1 generated by the measurement device 4.

Next, the control device 1 determines the sorting container 8 to be the sorting destination of the target item 7 detected at step S11 (step S12). In this instance, for example, the control device 1 determines the sorting container 8 which becomes the sorting destination of each item 7 detected at step S11, based on the measurement signal S1 and the sorting information IB. The process at step S11 and step S12 corresponds to the process executed by the objective task setting unit 70 of the operation planning unit 15 described above, for example.

Next, the control unit 1 determines whether or not the unloading and loading of the sorting container 8 is required (step S13). Then, if the control device 1 determines that the unloading and loading of the sorting container 8 is required (step S13; Yes), the control device 1 performs control for realizing the unloading and loading of the sorting container 8 (step S14). The process at step S13 and step S14, for example, corresponds to the process executed by the sorting container control device 17.

Then, the control device 1 determines whether or not sorting containers 8 are replenished (step S15). For example, the process at step S15 corresponds to the process executed by the determination unit 16. Then, if it is determined that the sorting containers 8 are replenished (step S15; Yes), the control device 1 updates (re-determines) the operation plan based on the arrangement of the sorting containers 8 after the replenishment (step S16). In this way, if the sorting containers 8 are replenished, the control device 1 updates (re-determines) the operation plan for sorting the items 7, based on the latest arrangement of the sorting containers 8. Thus, the control device 1 can correctly sorts the items 7, based on the latest arrangement of the sorting containers 8. In this instance, for example, the control device 1 newly formulates an operation plan of pick-and-place of the item 7 detected at step S11 while formulating an updated operation plan for the pick-and-place of the items 7 for which the operation plan was already determined and which have not been placed in the sorting container 8. The process at step S16 corresponds to, for example, the process executed by the operation planning unit 15 other than the objective task setting unit 70. On the other hand, if the sorting containers 8 are not replenished (step S15; No), the control unit 1 continues the process at step S14.

On the other hand, at step S13, if unloading and loading of the sorting container 8 is not required (step S13; No), the control device 1 determines the operation plan (step S17). The process at step S17 corresponds to, for example, the process executed by the operation planning unit 15 other than the objective task setting unit 70.

Then, the control device 1 controls the robot 51 based on the operation plan determined at step S16 or step S17 (step S18). It is noted that the control device 1 may proceed with the process at next step while continuing the robot control at step S18 until the determined operation plan is completed. The process at step S18, for example, corresponds to the process executed by the robot control unit 14.

Then, the control device 1 determines whether or not to terminate the control process of the robot 51 and the like (step S19). For example, if the control device 1 detects an external input or the like to stop the control process of the robot 51 and the like, the control device 1 determines that the control process of the robot 51 and the like should be terminated. When it is determined that the control process of the robot 51 and the like should be terminated (step S19; Yes), the control device 1 terminates the process of the flowchart. On the other hand, if it is determined that the control process of the robot 51 and the like should not be terminated, the control device 1 gets back to the process at step S11.

(7) Modifications

Next, a description will be given of the modifications in the first example embodiment. The following modifications may be applied in any combination.

First Modification

The block configuration of the operation planning unit 15 shown in FIG. 6 is an example, and various changes may be applied thereto.

For example, information on the candidates φ for the sequence of operations to be instructed to the robot 51 is stored in advance in the memory 12, and based on the information, the operation planning unit 15 executes the optimization process to be executed by the control input generation unit 75. Thus, the operation planning unit 15 performs selection of the optimum candidate q and determination of the control input of the robot 51. In this instance, the operation planning unit 15 may not have a function corresponding to the abstract state setting unit 71, the target logical formula generation unit 72, and the time step logical formula generation unit 73. Thus, information on the execution results from a part of the functional blocks in the operation planning unit 15 shown in FIG. 6 may be stored in advance as a part of the application information IA.

In another example, the application information IA includes design information such as a flowchart for designing the operation sequence to complete the objective task in advance, and the operation planning unit 15 may generate the operation sequence by referring to the design information. For example, JP2017-39170A discloses a specific example of executing a task based on a pre-designed task sequence.

Second Modification

The workspace shown in FIG. 3 is an example, and various changes may be made to the workspace shown in FIG. 3.

For example, a BCR 42 may not be provided in the workspace. In this case, for example, the objective task setting unit 70 recognizes the type and the position of items 7 on the first conveying machine 52A by applying the image recognition technique to an image obtained by the camera 41, and identifies an item 7 existing at a predetermined position as the target item 7 to be sorted. The objective task setting unit 70 identifies the sorting container 8 to be the sorting destination of the target item 7 based on the recognized type of the target item 7. In this instance, since the sorting of the items 7 is performed according to the type of the items 7 obtained as the image recognition results by the camera 41, there is no need to use the sorting information IB.

In another example, the items 7 picked up from the packing box 6 may be placed directly within the movement range of the robot 51. In this instance, the first conveying machine 52A in FIG. 3 may not be present. In yet another example, the sorting container replenishment mechanism 53 may detect, based on the output or the like from its own sensor, that the sorting container 8 has been unloaded from the sorting container board 54 or the sorting container board 55, and autonomously perform the replenishment operation of the sorting container 8 without depending on the control signal S2 from the control device 1.

In yet another example, sorting container replenishing machines 53 may be provided for the sorting container board 54 and the sorting container board 55, respectively. In this case, the sorting container replenishing machines 53 may be provided on the opposite sides to the positions shown in FIG. 3 with respect to the sorting container board 54 or the sorting container board 55, respectively. Instead, each of the sorting container board 54 and the sorting container board 55 may have a function corresponding to the sorting container replenishing machine 53. In this case, for example, each of the sorting container board 54 and the sorting container board 55 may have a mechanism for loading a sorting container 8 for replenishment from the inside to the position where the unloaded sorting container 8 was present if any one of the sorting containers 8 thereon is transferred onto the second conveying machine 52B. Further, in place of the sorting container replenishing machine 53, the robot arms 51A to 51C may perform the operation of replenishing the sorting container 8.

Further, the control process of the robot 51 shown in FIG. 4 and FIG. 8 can be suitably applied not only to the sorting operation of incoming items in a warehouse but also to the loading work in an assembly manufacturing industry, a food manufacturing industry, or a logistics industry.

Third Modification

The sorting control system 100 may include a warehouse management system (WMS: Warehouse Management System), and the control device 1 may perform processes related to parts sorting in cooperation with the warehouse management system.

Figure 9:
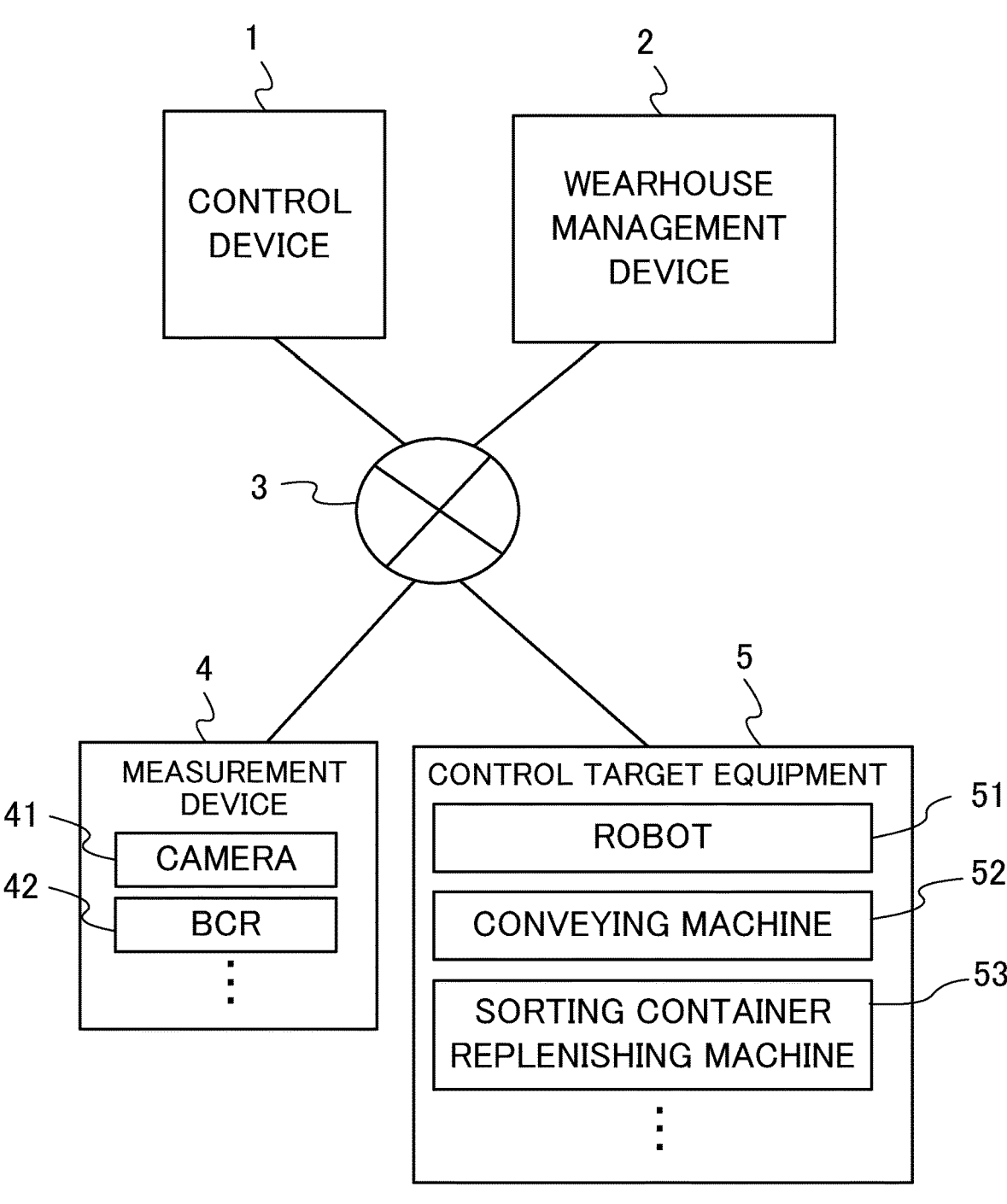
FIG. 9 It is an example of the configuration of the sorting control system in a modification.

FIG. 9 is a schematic configuration diagram of a sorting control system in 100A according to the third modification.

As shown in FIG. 9, the sorting control system 100A includes a warehouse management device 2 that manages the information in the warehouse management system. Then, the control device 1 executes the process to be executed by the control device 1 shown in FIG. 1 in cooperation with the warehouse management device 2. For example, the warehouse management device 2 manages the reading result of the bar code by the BCR 42 and the sorting information IB, and the control device 1 detects an item 7 that has passed through the BCR 42 by the camera 41 or the like and receives information from the warehouse management device 2 regarding the sorting container 8 to be the sorting destination of the item 7. According to this modification, the control device 1 performs data communication with the warehouse management device 2, thereby to determine the sorting container 8 to be the sorting destination of the item 7 and suitably formulate the operation plan of the robot 51 based on the above-described example embodiment.

Second Example Embodiment

Figure 10:
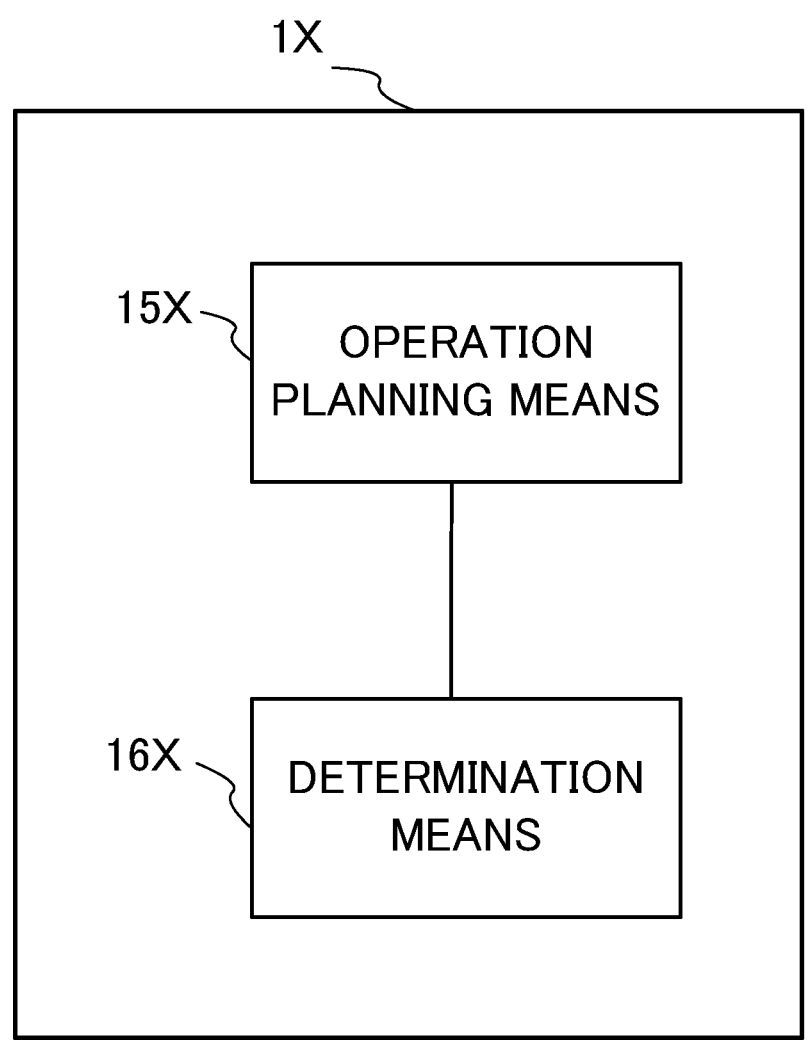
FIG. 10 It is an example of a block configuration of the control device in a second example embodiment.

FIG. 10 is a schematic configuration diagram of a control device 1X in the second example embodiment. As shown in FIG. 10, the control device 1X mainly includes an operation planning means 15X and a determination means 16X. The control device 1X may be configured by a plurality of devices.

The operation planning means 15X is configured to determine an operation plan of a robot regarding a work of sorting plural items into plural sorting containers. Here, the term "sorting plural items into plural sorting containers" herein indicates moving plural items into sorting containers so as to be in such a state where the items are sorted by class of each of the items. Examples of the operation planning means 15X include the operation planning unit 15 in the first example embodiment.

The determination means 16X is configured to determine whether or not the sorting containers are replenished. Here, the term "the sorting containers are replenished" herein indicates an empty sorting container which is a candidate for the sorting destination of the items is newly installed. Examples of the determination means 16X include the determination unit 16 in the first example embodiment.

Then, the operation planning means 15X is configured to update the operation plan based on the arrangement of the sorting containers after the replenishment if the sorting containers is replenished. Here, the term "update the operation plan" herein indicates formulating a new operation plan based on the arrangement of the sorting containers after the replenishment as an alternative to the operation plan formulated based on the state of the sorting containers before the replenishment. In this case, an operation plan is formulated for items for which sorting work has not been performed.

Figure 11:
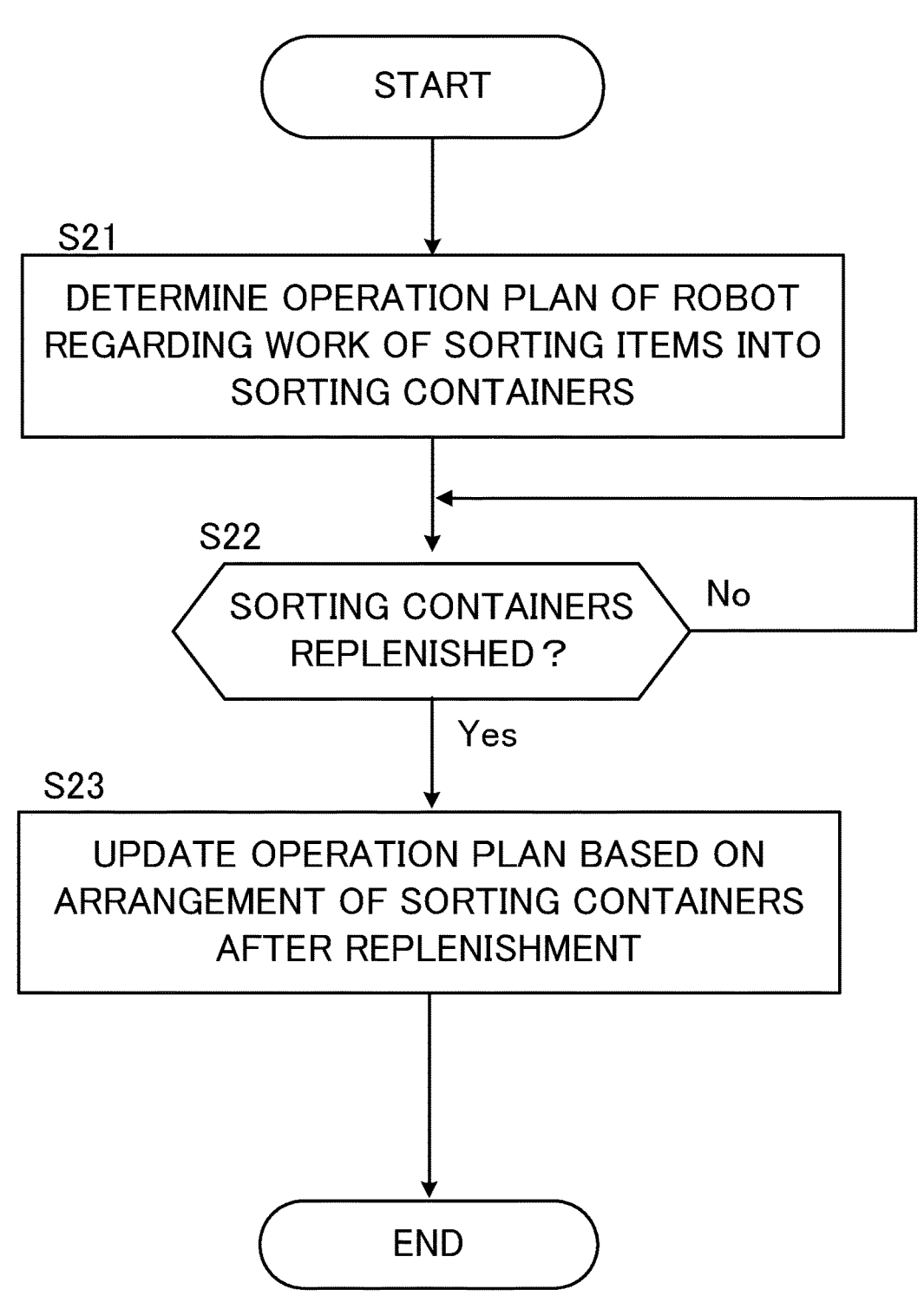
FIG. 11 It is an example of a flowchart to be executed by the control device in the second example embodiment.

FIG. 11 is a flowchart to be executed by the control device 1X in the second example embodiment. First, the operation planning means 15X determines an operation plan of a robot regarding a work of sorting plural items into plural sorting containers (step S21). The determination means 16X determines whether or not the sorting containers are replenished (step S22). If the sorting containers is replenished (step S22; Yes), the operation planning means 15X updates the operation plan based on the arrangement of the sorting containers after the replenishment (step S23). If the sorting containers is not replenished (step S22; No), the determination means 16X continues to determine whether or not the sorting containers are replenished at step S22. It is noted that, if the operation plan is successfully completed, the control device 1X may terminate the process of the flowchart without performing the process at step S23.

According to the configuration of the second example embodiment, the control device 1X can formulate an accurate operation plan even when there is replenishment of the sorting containers, and suitably cause the robot to execute the sorting operation of the items.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above (including modifications, the same applies hereinafter) can be described as, but not limited to, the following Supplementary Notes.

[Supplementary Note 1]

A control device comprising:

an operation planning means configured to determine an operation plan of a robot regarding a work of sorting plural items into plural sorting containers; and a determination means configured to determine whether or not the sorting containers are replenished, wherein the operation planning means is configured, if the sorting containers are replenished, to update the operation plan based on the arrangement of the sorting containers after the replenishment.

[Supplementary Note 2]

The control device according to Supplementary Note 1, wherein the robot includes a first robot and a second robot and a movement range of the first robot overlaps with a movement range of the second robot, and wherein the operation planning means is configured to determine the operation plan including an operation of a delivery of an item between the first robot and the second robot.

[Supplementary Note 3]

The control device according to Supplementary Note 2, wherein a sorting container outside the movement range of the first robot exists in the movement range of the second robot, and wherein the operation planning means is configured to determine the operation plan including the operation of moving an item, which exists in the movement range of the first robot and outside the movement range of the second robot, into the movement range of the second robot.

[Supplementary Note 4]

The control device according to any one of Supplementary Notes 1 to 3, further comprising a sorting container control means configured to control unloading and the replenishment of the sorting containers.

[Supplementary Note 5]

The control device according to Supplementary Note 4, wherein the sorting container control means is configured, if a sorting container to be a sorting destination of one of the plural items is in a predetermined reference state, to unload the sorting container in the reference state and load a new sorting container.

[Supplementary Note 6]

The control device according to Supplementary Note 4, wherein the sorting container control means is configured to unload one of the plural sorting containers and load a new sorting container if there is no candidate, in the plural sorting containers, for the sorting destination of one of the plural items.

[Supplementary Note 7]

The control device according to Supplementary Note 6, wherein the sorting container control means is configured to select the one of the plural sorting containers from the plural sorting containers, based on a number or a ratio of accommodated items in each of the plural sorting containers.

[Supplementary Note 8]

The control device according to any one of Supplementary Notes 1 to 7, wherein the operation planning means is configured to generate, as the operation plan, an operation sequence representing time-step based operation of the robot based on a logical formula, in a form of a temporal logic, representing an objective task to be executed by the robot.

[Supplementary Note 9]

The control device according to Supplementary Note 8, wherein the objective task is a pick-and-place task of moving the plural items into the plural sorting containers based on classification of the items.

[Supplementary Note 10]

A control method executed by a computer, the control method comprising determining an operation plan of a robot regarding a work of sorting plural items into plural sorting containers; and determining whether or not the sorting containers are replenished, if the sorting containers are replenished, updating the operation plan based on the arrangement of the sorting containers after the replenishment.

[Supplementary Note 11]

A storage medium storing a program executed by a computer, the program causing the computer to:

determine an operation plan of a robot regarding a work of sorting plural items into plural sorting containers; and determine whether or not the sorting containers are replenished, if the sorting containers are replenished, update the operation plan based on the arrangement of the sorting containers after the replenishment.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 1, 1X Control device
2 Warehouse control equipment
3 Communication network
4 Measurement device
5 Control target equipment
41 Camera
42 BCR
51 Robot
52 Conveying machine
53 Sorting container replenishing machine
100,100A Sorting control system

What is claimed is:
1. A control device comprising:
at least one memory configured to store instructions; and
at least one processor configured to execute the instructions to:
determine an operation plan of a robot regarding a pick-and-place task of moving and sorting plural items into plural first sorting containers based on classification of the items; and
determine whether or not a second sorting container is loaded as a replenishment which leads to shift in an arrangement of the first sorting containers,
in a case where the second sorting container is loaded, update the operation plan based on the arrangement of the first and second sorting containers after the replenishment,
wherein the at least one processor is configured to execute the instructions to control the robot based on the operation plan.
2. The control device according to claim 1,
wherein the robot includes a first robot and a second robot and a movement range of the first robot overlaps with a movement range of the second robot, and
wherein the at least one processor is configured to execute the instructions to determine the operation plan including an operation of a delivery of an item between the first robot and the second robot.
3. The control device according to claim 2,
wherein a third sorting container outside the movement range of the first robot exists in the movement range of the second robot, and
wherein the at least one processor is configured to execute the instructions to determine the operation plan including the operation of moving an item, which exists in the movement range of the first robot and outside the movement range of the second robot, into the movement range of the second robot.
4. The control device according to claim 3,
wherein the at least one processor is configured to execute the instructions to determine whether or not the item on a conveying machine exists in the movement range of the first robot based on a closest position of the item to the first robot on the conveying machine.

5. The control device according to claim 1,
wherein the at least one processor is configured to further execute the instructions to control unloading and the replenishment of the first and second sorting containers.
6. The control device according to claim 5,
wherein the at least one processor is configured, in a case where a third sorting container to be a sorting destination of one of the plural items is in a predetermined reference state, to execute the instructions to unload the third sorting container in the reference state and load a new sorting container.
7. The control device according to claim 5,
wherein the at least one processor is configured to execute the instructions to unload one of the plural first sorting containers and load a new sorting container in a case where there is no candidate, in the plural first sorting containers, for a sorting destination of one of the plural items.
8. The control device according to claim 7,
wherein the at least one processor is configured to execute the instructions to select the one of the plural first sorting containers from the plural first sorting containers, based on a number or a ratio of accommodated items in each of the plural first sorting containers.
9. The control device according to claim 1,
wherein the at least one processor is configured to execute the instructions to generate, as the operation plan, an operation sequence representing time-step based operation of the robot based on a logical formula, in a form of a temporal logic, representing an objective task to be executed by the robot.
10. A control method executed by a computer, the control method comprising
determining an operation plan of a robot regarding a pick-and-place task work of moving and sorting plural items into plural first sorting containers based on classification of the items; and
determining whether or not a second sorting container is loaded as a replenishment which leads to shift in an arrangement of the first sorting containers,
in a case where the second sorting container is loaded, updating the operation plan based on the arrangement of the first and second sorting containers after the replenishment,
wherein the computer controls the robot based on the operation plan.
11. A non-transitory computer readable storage medium storing a program executed by a computer, the program causing the computer to:
determine an operation plan of a robot regarding a pick-and-place task of moving and sorting plural items into plural first sorting containers based on classification of the items; and
determine whether or not a second sorting container is loaded as a replenishment which leads to shift in an arrangement of the first sorting containers,
in a case where the second sorting container is loaded, update the operation plan based on the arrangement of the first and second sorting containers after the replenishment,
wherein the computer controls the robot based on the operation plan.

* * * * *